United States Patent
Sahara et al.

(10) Patent No.: US 9,608,486 B2
(45) Date of Patent: Mar. 28, 2017

(54) ROTATING ELECTRICAL DEVICE

(71) Applicant: ASMO CO., LTD., Kosai, Shizuoka-pref. (JP)

(72) Inventors: Yoshimichi Sahara, Toyohashi (JP); Masato Ooishi, Toyota (JP)

(73) Assignee: ASMO CO., LTD., Kosai (JP)

(*) Notice: Subject to any disclaimer, the term of this patent is extended or adjusted under 35 U.S.C. 154(b) by 0 days.

(21) Appl. No.: 14/275,853

(22) Filed: May 12, 2014

(65) Prior Publication Data

US 2014/0339936 A1    Nov. 20, 2014

(30) Foreign Application Priority Data

May 14, 2013   (JP) ................. 2013-102508

(51) Int. Cl.
| | |
|---|---|
| H02K 11/00 | (2016.01) |
| H02K 3/00 | (2006.01) |
| H02K 3/28 | (2006.01) |

(52) U.S. Cl.
CPC ................. *H02K 3/28* (2013.01)

(58) Field of Classification Search
CPC ........... H02K 1/16; H02K 11/00; H02K 5/00
USPC ............................ 310/71, 180, 184, 197, 198
See application file for complete search history.

(56) References Cited

U.S. PATENT DOCUMENTS

| | | | | |
|---|---|---|---|---|
| 2007/0252454 A1* | 11/2007 | Hayashi | ................ | H02K 3/522 310/71 |
| 2008/0116755 A1* | 5/2008 | Sahara et al. | .................. | 310/71 |

FOREIGN PATENT DOCUMENTS

| | | | |
|---|---|---|---|
| JP | 2012165523 A | * | 8/2012 |
| JP | 2010-273450 A | | 12/2012 |

* cited by examiner

*Primary Examiner* — Jose Gonzalez Quinones
(74) *Attorney, Agent, or Firm* — Solaris Intellectual Property Group, PLLC

(57) ABSTRACT

A rotating electrical device comprising a circuit section being disposed offset from a motor section to one side or another side, in a direction orthogonal to an axial direction of the motor section as viewed in the axial direction of the motor section; a stator configuring the motor section together with a rotor, the stator comprising a plurality of teeth formed in a radial shape and a plurality of windings that each includes a terminal-end portion that extends in the axial direction of the motor section, the plurality of windings being respectively wound on any of the plurality of teeth such that each of the terminal-end portions is disposed further to a side in the orthogonal direction from a central axis of the motor section where the circuit section is disposed; and a plurality of terminals that wire-in the circuit section and the terminal-end portions of the plurality of windings.

13 Claims, 24 Drawing Sheets

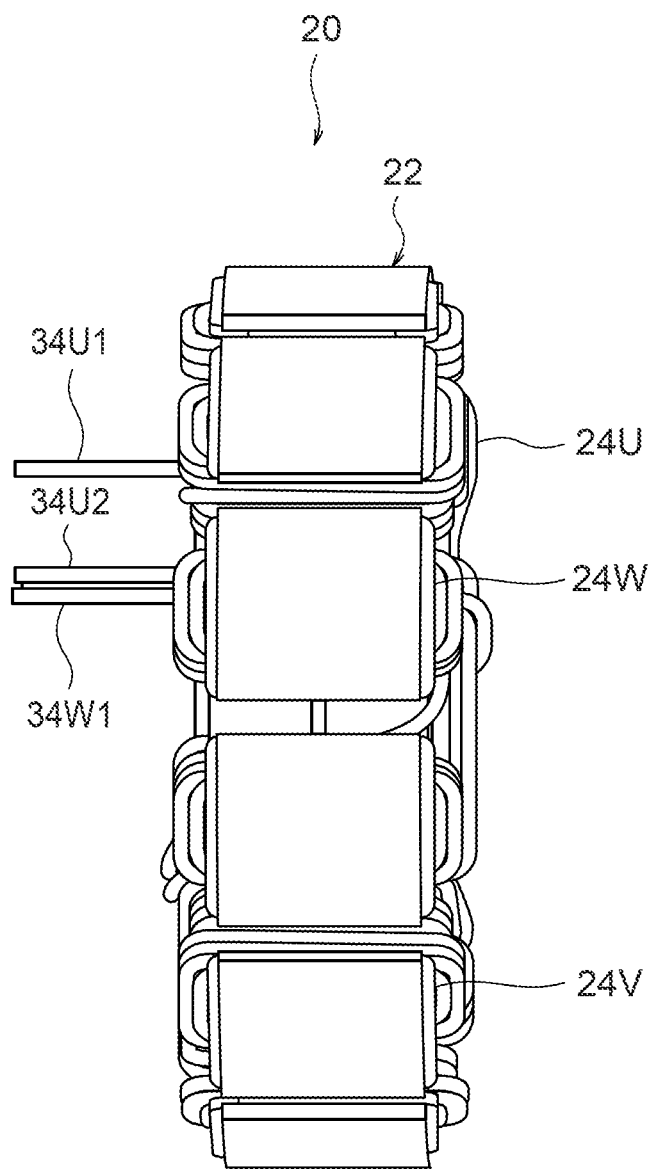

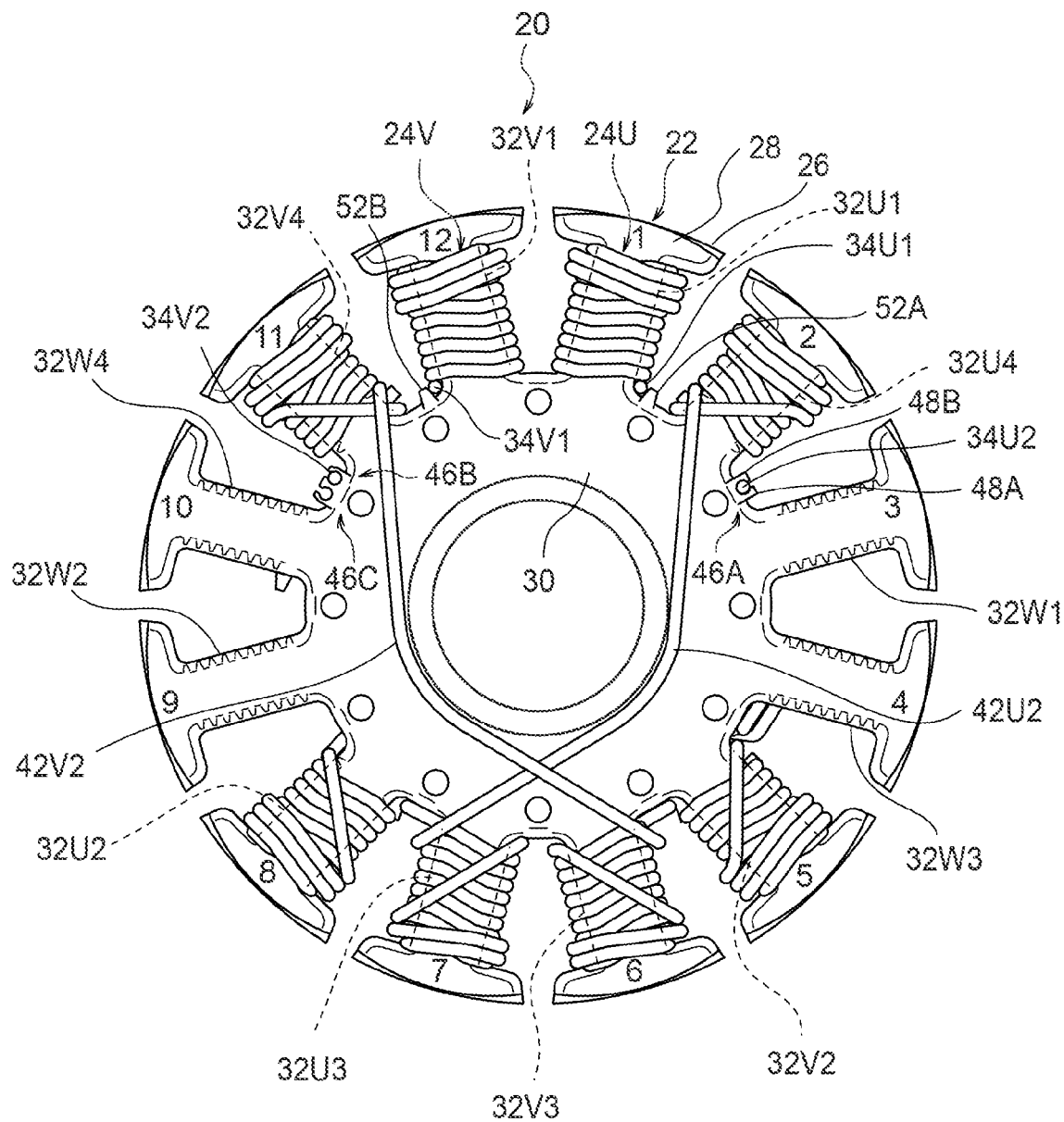

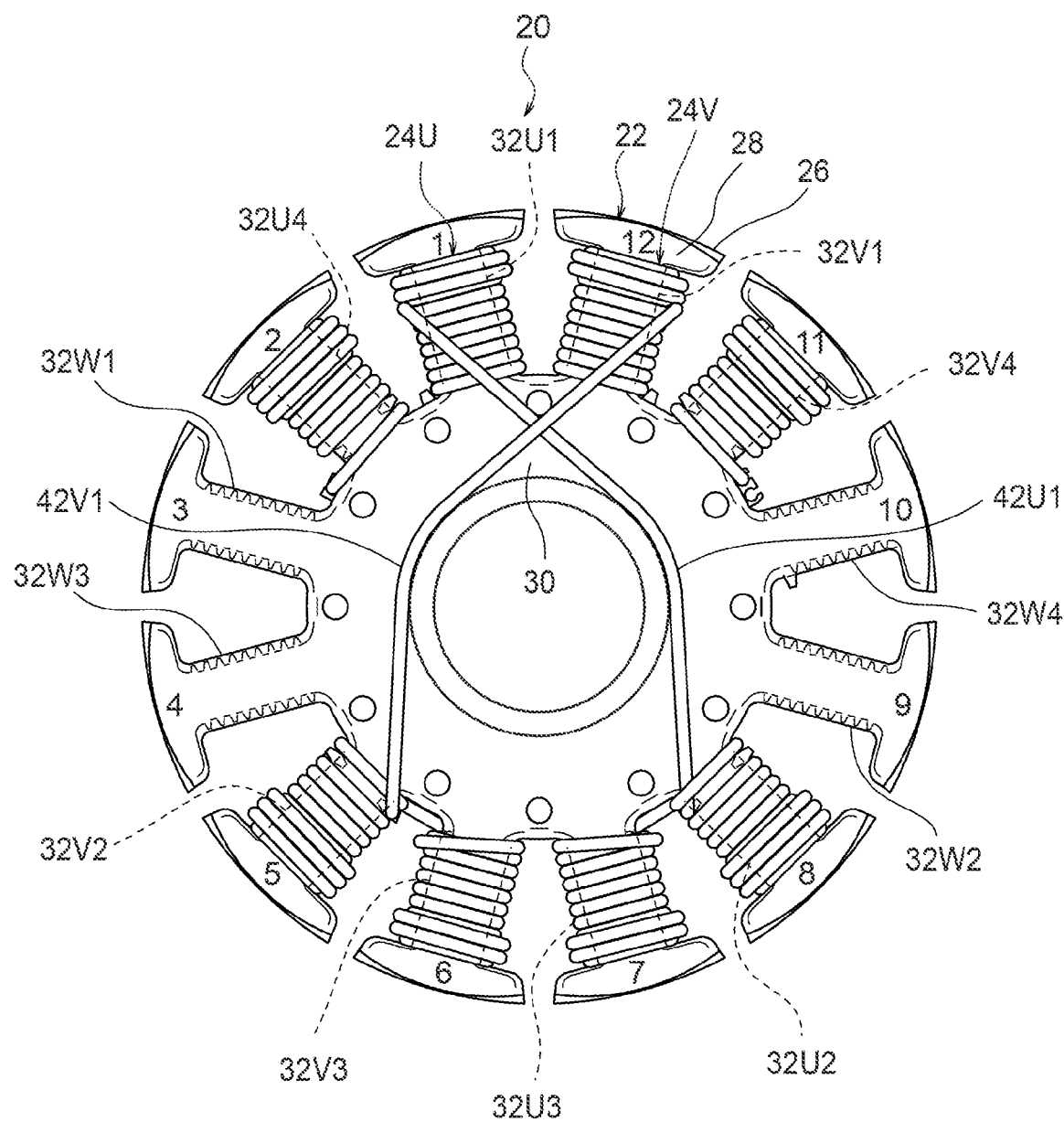

ROTATING ELECTRICAL DEVICE

CROSS-REFERENCE TO RELATED APPLICATION

This application claims priority under 35 USC 119 from Japanese Patent Application, No. 2013-102508 filed May 14, 2013, the disclosure of which is incorporated by reference herein.

BACKGROUND OF THE INVENTION

Technical Field

The present invention relates to a rotating electrical device.

Related Art

As illustrated in Japanese Patent Application Laid-Open (JP-A) No. 2010-273450 (FIG. 12), rotating electrical devices exist that are provided with a motor section including a rotor and a stator, and with a circuit section disposed, with respect to the motor section, offset to one side in a direction orthogonal to an axial direction of the motor section, as viewed in the motor section axial direction.

In such a rotating electrical device, the stator includes plural teeth formed in a radial shape, and plural windings wound on the plural teeth. Terminal-end portions of the plural windings extend in the axial direction of the motor section, and the circuit section and the terminal-end portions of the plural windings are wired in by plural terminals. In such a rotating electrical device, the terminal-end portions of the plural windings are directly connected to the terminals of the circuit section, thereby enabling an intermediate terminal to be omitted.

SUMMARY

However, in the rotating electrical devices as described above, although some of the winding terminal-end portions out of the plural windings are disposed further to the circuit section side (one side of a direction orthogonal to the motor section axial direction) than the central axis of the motor section, the remaining winding terminal-end portions are disposed further to the opposite side with respect to the central axis of the motor section to the circuit section side (another side in the direction orthogonal to the motor section axial direction).

As a result, the structure of the terminals for wiring-in the windings becomes more complex, and there is a possibility of increased cost.

A subject of the present invention is therefore to provide a rotating electrical device capable of suppressing an increase in cost.

In order to address the above subject, a rotating electrical device of a first aspect of the present invention is equipped with: a circuit section that is disposed offset from a motor section to one side or another side, in a direction orthogonal to an axial direction of the motor section as viewed in the axial direction of the motor section; a stator that configures the motor section together with a rotor, the stator includes plural teeth formed in a radial shape and plural windings that each includes a terminal-end portion that extends in the axial direction of the motor section, the plural windings are respectively wound on any of the plural teeth such that each of the terminal-end portions is disposed further to the side in the orthogonal direction from a central axis of the motor section where the circuit section is disposed; and plural terminals that wire-in the circuit section and the terminal-end portions of the plural windings.

In the rotating electrical device of the first aspect, all the plural windings of the stator are wound on any of the plural teeth such that each of the terminal-end portions is disposed further to the side in the orthogonal direction to the axial direction of the motor section from the central axis of the motor section where the circuit section is disposed. As a result, the structure of the terminals for wiring-in the windings can be simplified, enabling an increase in cost to be suppressed.

Note that a second to a fourth aspect of the present invention as described below are well suited as examples in which each of the terminal-end portions of all the plural windings is disposed further to the side in the orthogonal direction to the axial direction of the motor section from the central axis of the motor section where the circuit section is disposed.

A rotating electrical device of the second aspect of the present invention is the rotating electrical device of the first aspect, in which: the motor section includes three phases of delta wired windings formed by the plural windings, and is configured as a 10-pole 12-slot, or a 14-pole 12-slot, outer-rotor brushless motor. The plural teeth are formed in the radial shape at a periphery of a circular ring portion of the stator, the plural teeth are numbered from a $1^{st}$ tooth to a $12^{th}$ tooth in sequence along a circumferential direction of the stator, and the outer peripheral side of the stator is a leading end side of each of the teeth, the first phase winding has a winding start terminal-end portion disposed between the $1^{st}$ tooth and the $2^{nd}$ tooth so as to extend toward one side in an axial direction of the stator (referred to below simply as the axial direction), and is wound on the $1^{st}$ tooth in a counterclockwise direction as viewed from the leading end side of the 1st tooth, then pulled out at the other side in the axial direction as a crossover wire and routed to the $8^{th}$ tooth while passing the circular ring portion, then wound on the $8^{th}$ tooth in a counterclockwise direction as viewed from the leading end side of the $8^{th}$ tooth, then wound on the $7^{th}$ tooth in a clockwise direction as viewed from the leading end side of the $7^{th}$ tooth, then pulled out at the one side in the axial direction as a crossover wire and routed to the $2^{nd}$ tooth while passing the circular ring portion, then wound on the $2^{nd}$ tooth in a clockwise direction as viewed from the leading end side of the $2^{nd}$ tooth, and has a winding finish terminal-end portion disposed between the $2^{nd}$ tooth and the $3^{rd}$ tooth so as to extend toward the one side in the axial direction. The second phase winding has a winding start terminal-end portion disposed between the $12^{th}$ tooth and the $11^{th}$ tooth so as to extend toward the one side in the axial direction, is wound on the $12^{th}$ tooth in a clockwise direction as viewed from the leading end side of the $12^{th}$ tooth, then pulled out at the other side in the axial direction as a crossover wire and routed to the $5^{th}$ tooth while passing the circular ring portion, then wound on the $5^{th}$ tooth in a clockwise direction as viewed from the leading end side of the $5^{th}$ tooth, then wound on the $6^{th}$ tooth in a counterclockwise direction as viewed from the leading end side of the $6^{th}$ tooth, then pulled out at the one side in the axial direction as a crossover wire and routed to the $11^{th}$ tooth while passing the circular ring portion, then wound on the $11^{th}$ tooth in a counterclockwise direction as viewed from the leading end side of the 11th tooth, and has a winding finish terminal-end portion disposed between the $11^{th}$ tooth and the $10^{th}$ tooth so as to extend toward the one side in the axial direction. The third phase winding has a winding start terminal-end portion disposed between the $2^{nd}$ tooth and the $3^{rd}$ tooth so as to extend toward the one side in the axial direction, is wound on the $3^{rd}$ tooth in a clockwise direction as viewed from the leading end side of the $3^{rd}$ tooth, then pulled out at the one side in the axial direction as a first crossover wire and routed to the $9^{th}$ tooth while passing the circular ring portion, then wound on the $9^{th}$ tooth in a counterclockwise direction as viewed from the leading end side of the $9^{th}$ tooth, then pulled out at the one side in the axial direction as a second crossover wire and routed to the $4^{th}$ tooth while passing the circular ring portion, then wound on the $4^{th}$ tooth in a counterclockwise direction as viewed from the leading end side of the $4^{th}$ tooth, then pulled out at the other side in the axial direction as a crossover wire and routed to the $10^{th}$ tooth while passing the circular ring portion, then wound on the $10^{th}$ tooth in a clockwise direction as viewed from the leading end side of the $10^{th}$ tooth, and has a winding finish terminal-end portion disposed between the $10^{th}$ tooth and the $11^{th}$ tooth so as to extend toward the one side in the axial direction. The stator is disposed such that the $1^{st}$, $2^{nd}$, $3^{th}$, $10^{th}$, $11^{th}$ and $12^{th}$ teeth are positioned further to the side where the circuit section is disposed in the orthogonal direction from the central axis of the motor section.

A rotating electrical device of the third aspect of the present invention is the rotating electrical device of the first aspect, in which: the motor section includes three phases of delta wired windings formed by the plural windings, and is configured as a 10-pole 12-slot, or a 14-pole 12-slot, outer-rotor brushless motor. The plural teeth are formed in the radial shape at a periphery of a circular ring portion of the stator, the plural teeth are numbered from a $1^{st}$ tooth to a $12^{th}$ tooth in sequence along a circumferential direction of the stator, and the outer peripheral side of the stator is a leading end side of each of the teeth, the first phase winding has a winding start terminal-end portion disposed between the $1^{st}$ tooth and the $2^{nd}$ tooth so as to extend toward one side in an axial direction of the stator (referred to below simply as the axial direction), and is wound on the $1^{st}$ tooth in a counterclockwise direction as viewed from the leading end side of the 1st tooth, then pulled out at the other side in the axial direction as a crossover wire and routed to the $8^{th}$ tooth while passing the circular ring portion, then wound on the $8^{th}$ tooth in a counterclockwise direction as viewed from the leading end side of the $8^{th}$ tooth, then wound on the $7^{th}$ tooth in a clockwise direction as viewed from the leading end side of the $7^{th}$ tooth, then pulled out at the one side in the axial direction as a crossover wire and routed to the $2^{nd}$ tooth while passing the circular ring portion, then wound on the $2^{nd}$ tooth in a clockwise direction as viewed from the leading end side of the $2^{nd}$ tooth, and has a winding finish terminal-end portion disposed between the $2^{nd}$ tooth and the $3^{rd}$ tooth so as to extend toward the one side in the axial direction. The second phase winding has a winding start terminal-end portion disposed between the $12^{th}$ tooth and the $11^{th}$ tooth so as to extend toward the one side in the axial direction, is wound on the $12^{th}$ tooth in a clockwise direction as viewed from the leading end side of the $12^{th}$ tooth, then pulled out at the other side in the axial direction as a crossover wire and routed to the $5^{th}$ tooth while passing the circular ring portion, then wound on the $5^{th}$ tooth in a clockwise direction as viewed from the leading end side of the $5^{th}$ tooth, then wound on the $6^{th}$ tooth in a counterclockwise direction as viewed from the leading end side of the $6^{th}$ tooth, then pulled out at the one side in the axial direction as a crossover wire and routed to the $11^{th}$ tooth while passing the circular ring portion, then wound on the $11^{th}$ tooth in a counterclockwise direction as viewed from the leading end side of the $11^{th}$ tooth, and has a winding finish terminal-end portion disposed between the $11^{th}$ tooth and the $10^{th}$ tooth so as to extend toward the one side in the axial direction. The third phase winding has a winding start terminal-end portion disposed between the $2^{nd}$ tooth and the $3^{rd}$ tooth so as to extend toward the one side in the axial direction, and is wound on the $3^{rd}$ tooth in a clockwise direction as viewed from the leading end side of the $3^{rd}$ tooth, then wound on the $4^{th}$ tooth in a counterclockwise direction as viewed from the leading end side of the $4^{th}$ tooth, then pulled out at the other side in the axial direction as a crossover wire and routed to the $9^{th}$ tooth while passing the circular ring portion, then wound on the $9^{th}$ tooth in a counterclockwise direction as viewed from the leading end side of the $9^{th}$ tooth, then wound on the $10^{th}$ tooth in a clockwise direction as viewed from the leading end side of the $10^{th}$ tooth, and has a winding finish terminal-end portion disposed between the $10^{th}$ tooth and the $11^{th}$ tooth so as to extend toward the one side in the axial direction. The stator is disposed such that the $1^{st}$, $2^{nd}$, $3^{rd}$, $10^{th}$, $11^{th}$ and $12^{th}$ teeth are positioned further to the side where the circuit section is disposed in the orthogonal direction from the central axis of the motor section.

A rotating electrical device of the fourth aspect of the present invention is the rotating electrical device of the first aspect, in which: the motor section includes three phases of delta wired windings formed by the plural windings, and is configured as a 10-pole 12-slot, or a 14-pole 12-slot, outer-rotor brushless motor. The plural teeth are formed in the radial shape at a periphery of a circular ring portion of the stator, the plural teeth are numbered from a $1^{st}$ tooth to a $12^{th}$ tooth in sequence along a circumferential direction of the stator, and the outer peripheral side of the stator is a leading end side of each of the teeth, the first phase winding has a winding start terminal-end portion disposed between the $1^{st}$ tooth and the $2^{nd}$ tooth so as to extend toward one side in an axial direction of the stator (referred to below simply as the axial direction), and is wound on the $1^{st}$ tooth in a counterclockwise direction as viewed from the leading end side of the $1^{st}$ tooth, then pulled out at the other side in the axial direction as a crossover wire and routed to the $8^{th}$ tooth while passing the circular ring portion, then wound on the $8^{th}$ tooth in a counterclockwise direction as viewed from the leading end side of the $8^{th}$ tooth, then wound on the $7^{th}$ tooth in a clockwise direction as viewed from the leading end side of the $7^{th}$ tooth, then pulled out at the one side in the axial direction as a crossover wire and routed to the $2^{nd}$ tooth while passing the circular ring portion, then wound on the $2^{nd}$ tooth in a clockwise direction as viewed from the leading end side of the $2^{nd}$ tooth, and has a winding finish terminal-end portion disposed between the $2^{nd}$ tooth and the $3^{rd}$ tooth so as to extend toward the one side in the axial direction. The second phase winding has a winding start terminal-end portion disposed between the $12^{th}$ tooth and the $11^{th}$ tooth so as to extend toward the one side in the axial direction, is wound on the $12^{th}$ tooth in a clockwise direction as viewed from the leading end side of the $12^{th}$ tooth, then pulled out at the other side in the axial direction as a crossover wire and routed to the $5^{th}$ tooth while passing the circular ring portion, then wound on the $5^{th}$ tooth in a clockwise direction as viewed from the leading end side of the $5^{th}$ tooth, then wound on the $6^{th}$ tooth in a counterclockwise direction as viewed from the leading end side of the $6^{th}$ tooth, then pulled out at the one side in the axial direction as a crossover wire and routed to the $11^{th}$ tooth while passing the circular ring portion, then wound on the $11^{th}$ tooth in a counterclockwise direction as viewed from the leading end side of the $11^{th}$ tooth, and has a winding finish terminal-end portion disposed between the $11^{th}$ tooth and the $10^{th}$ tooth so as to extend toward the one side in the axial direction. The third phase winding has a winding start terminal-end portion disposed between the $10^{th}$ tooth and the $11^{th}$ tooth so as to extend toward the one side in the axial direction, is wound on the $10^{th}$ tooth in a counterclockwise direction as viewed from the leading end side of the $10^{th}$ tooth, then wound on the $9^{th}$ tooth in a clockwise direction as viewed from the leading end side of the $9^{th}$ tooth, then pulled out at the other side in the axial direction as a crossover wire and routed to the $4^{th}$ tooth while passing the circular ring portion, then wound on the $4^{th}$ tooth in a clockwise direction as viewed from the leading end side of the $4^{th}$ tooth, then wound on the $3^{rd}$ tooth in a counterclockwise direction as viewed from the leading end side of the $3^{rd}$ tooth, and has a winding finish terminal-end portion disposed between the $2^{nd}$ tooth and the $3^{rd}$ tooth so as to extend toward the one side in the axial direction. The stator is disposed such that the $1^{st}$, $2^{nd}$, $3^{rd}$, $10^{th}$, $11^{th}$ and $12^{th}$ teeth are positioned further to the side where the circuit section is disposed in the orthogonal direction from the central axis of the motor section.

A rotating electrical device of a fifth aspect of the present invention is the rotating electrical device of any one of the second aspect to the fourth aspect, in which: the windings are wound on each of the teeth from a tooth base end side that is on the circular ring portion side of the stator; and when the windings are routed from one tooth to an adjacent tooth out of the $1^{st}$ tooth to the $12^{th}$ tooth, the final transition turn of the winding wound on the one tooth passes inside in a stator radial direction from the first turn of the winding wound on the one tooth.

In the rotating electrical device of the fifth aspect, when the windings are routed from the one tooth to the adjacent tooth out of the $1^{st}$ tooth to the $12^{th}$ tooth, the final transition turn of the winding wound on the one tooth passes inside in the stator radial direction from the first turn of the winding wound on the one tooth. As a result, when the windings are being wound from the one to the other of adjacent teeth, the winding can easily be wound on the other tooth from the base end side, leading to good alignment of the winding at the other tooth (the next tooth), and thereby enabling high speed winding.

A rotating electrical device of a sixth aspect of the present invention is the rotating electrical device of the fifth aspect, in which a protruding portion is formed at the stator so as to be interposed between the first turn and the final transition turn of the winding.

In the rotating electrical device of the sixth aspect, the protruding portion is formed at the stator so as to be interposed between the first turn and the final transition turn of the winding. This thereby enables interference between the respective first turns and final transition turns of the windings to be suppressed, enabling good alignment of the windings at the other tooth (the next tooth) to be achieved.

A rotating electrical device of a seventh aspect of the present invention is the rotating electrical device of any one of the second aspect to the sixth aspect, in which a supporting portion is formed at the stator to support the winding start terminal-end portion of the winding.

The rotating electrical device of the seventh aspect enables the winding start terminal-end portion of the winding to be supported by the supporting portion formed at the stator. As a result, spring-back of the winding start terminal-end portions can be suppressed, enabling the terminal-end portions to be disposed extending in the axial direction of the motor section, enabling the windings to be easily wound on from the base end side of the teeth.

A rotating electrical device of a eighth aspect of the present invention is the rotating electrical device of any one of the second aspect to the seventh aspect, in which a retaining portion is formed at the stator to retain the winding finish terminal-end portion of the winding.

The rotating electrical device of the eighth aspect enables the winding finish terminal-end portion of the winding to be retained by the retaining portion formed at the stator. As a result, spring-back of the winding finish terminal-end portions can be suppressed, enabling the terminal-end portions to be disposed extending in the axial direction of the motor section.

BRIEF DESCRIPTION OF THE DRAWINGS

Embodiments of the present invention will be described in detail based on the following figures, wherein:

FIG. 2 is a side view of a stator;

FIG. 4A is a plan view illustrating a state in which U-phase and V-phase windings are wound on a stator;

FIG. 4B is a bottom view illustrating a state in which U-phase and V-phase windings are wound on a stator;

DETAILED DESCRIPTION OF THE INVENTION

Explanation follows regarding an exemplary embodiment of the present invention, with reference to the drawings.

Figure 1:
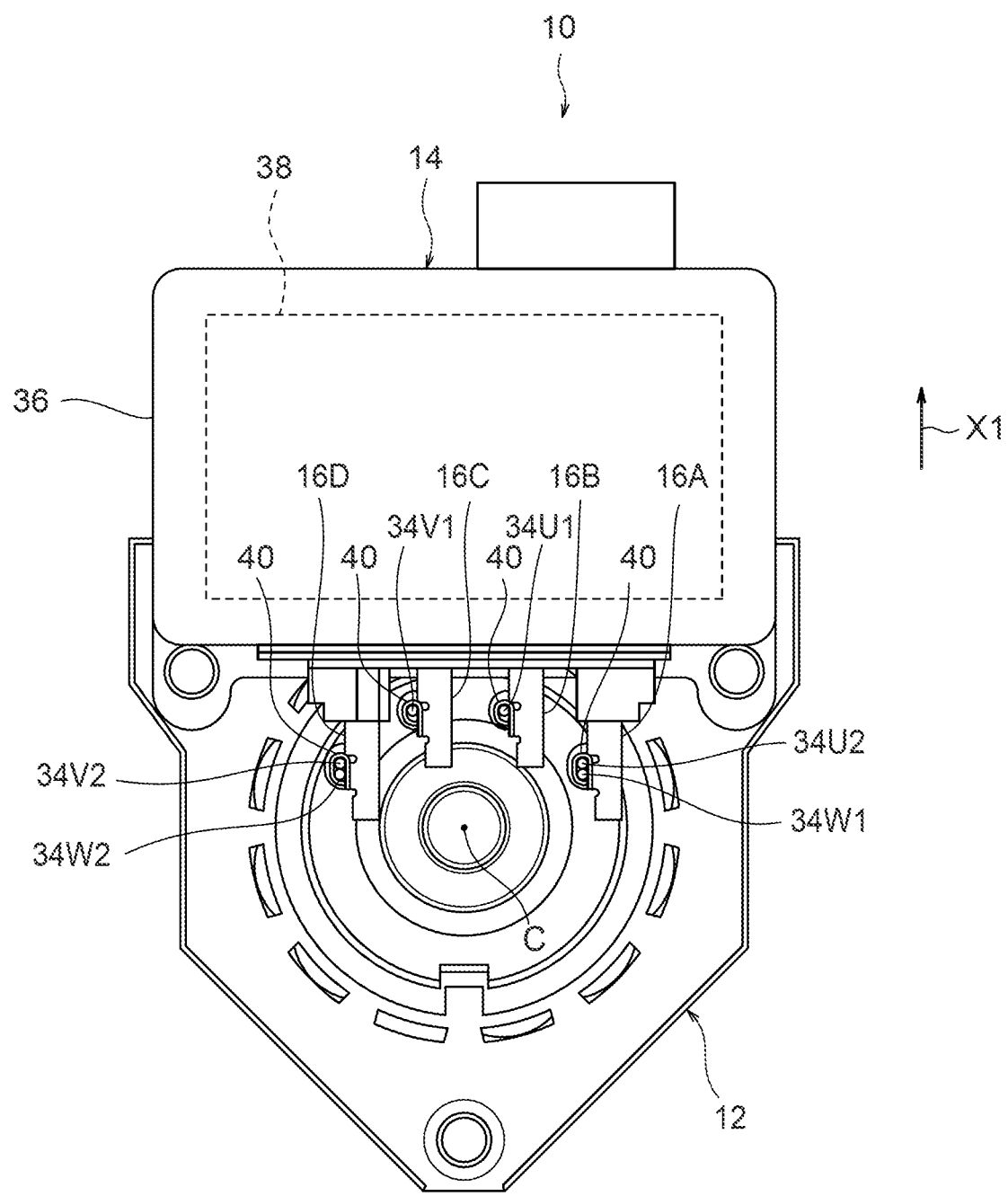
FIG. 1 is a plan view of a rotating electrical device.

As illustrated in FIG. 1, a rotating electrical device 10 according to the exemplary embodiment of the present invention is equipped with a motor section 12, a circuit section 14 and plural terminals 16A to 16D.

Figure 5A:
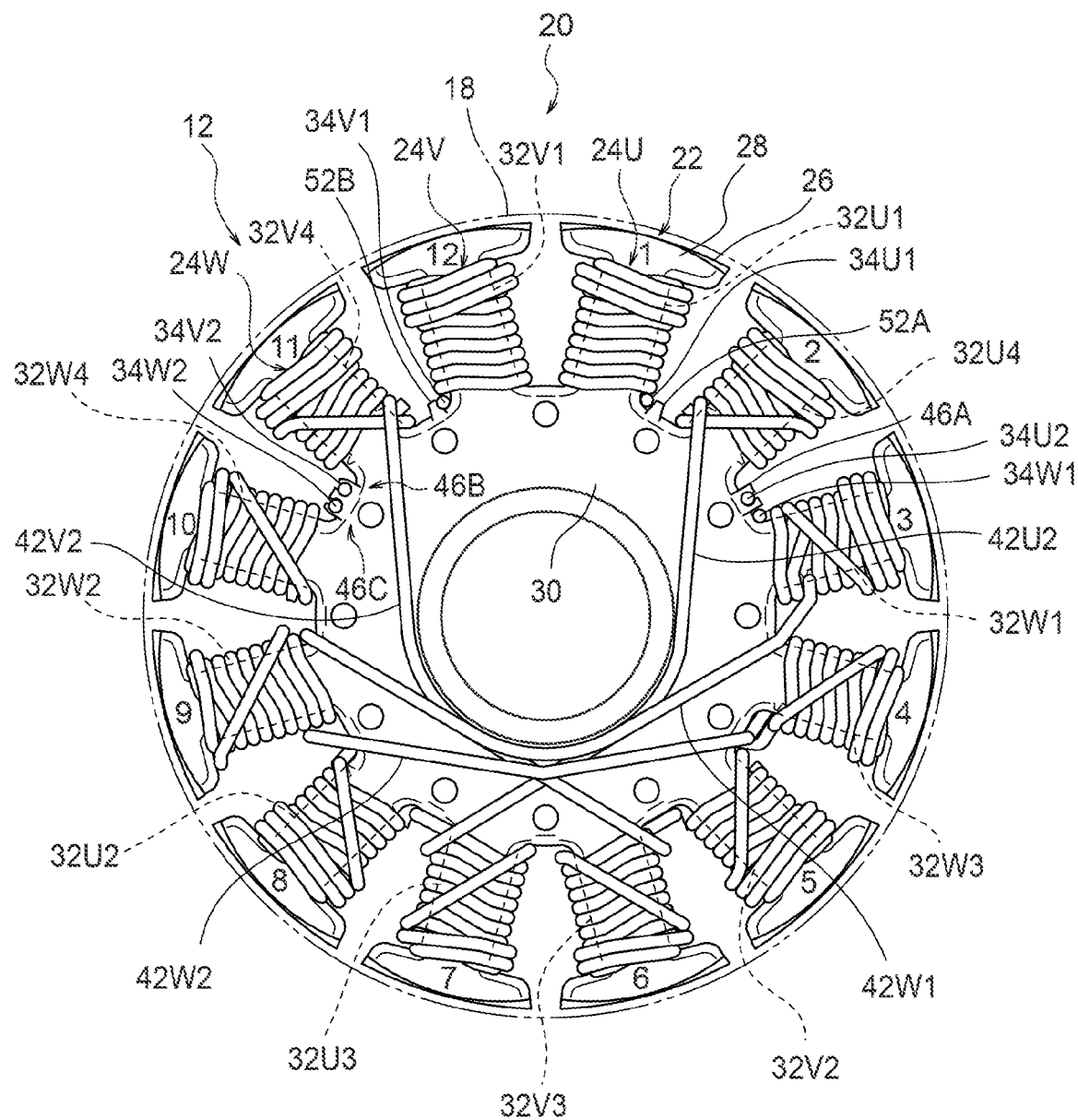
FIG. 5A is a plan view illustrating a state in which U-phase, V-phase and W-phase windings are wound on a stator.
Figure 5B:
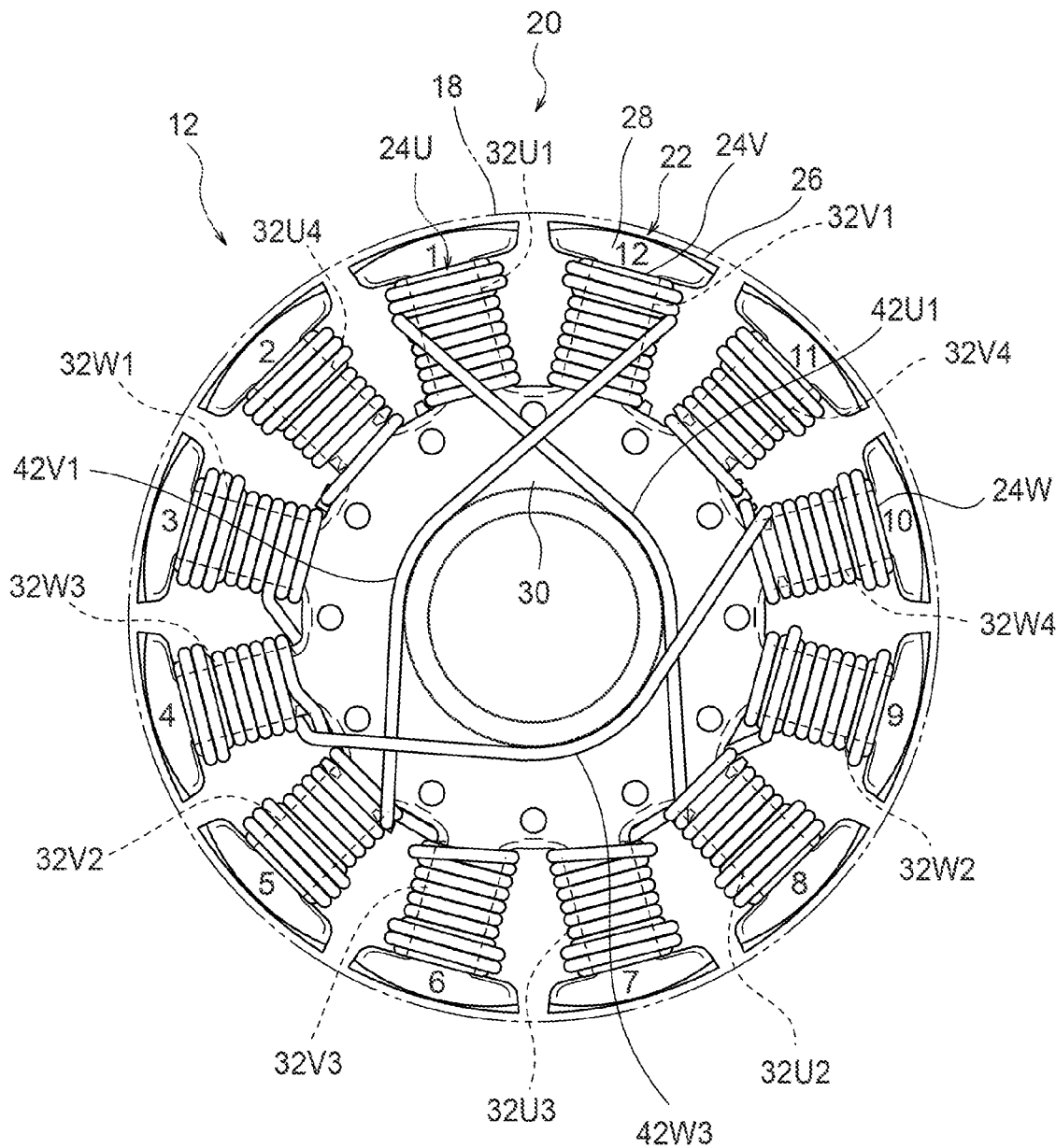
FIG. 5B is a bottom view illustrating a state in which U-phase, V-phase and W-phase windings are wound on a stator.

The motor section 12 is, for example, a 10-pole, 12-slot outer-rotor brushless motor. As illustrated in FIG. 5A and FIG. 5B, the motor section 12 includes a rotor 18 and a stator 20

The stator 20 includes a stator core 22 and plural windings 24U, 24V, 24W. The stator core 22 includes a core main body 26 formed of plural layered core sheets, and an insulator 28 installed to the core main body 26 from both sides in an axial direction of the motor section 12. A ring shaped circular ring portion 30 is formed to an inner peripheral side of the stator core 22, and plural teeth 32U1 to 32W4 are formed in a radial shape at the periphery of the circular ring portion 30.

The plural windings 24U, 24V, 24W configure three phases, a U-phase, a V-phase and a W-phase, and are respectively wound on the plural teeth 32U1 to 32W4. As illustrated in FIG. 2, terminal-end portions 34U1, 34U2, 34W1 of the plural windings 24U, 24V, 24W, and other terminal-end portions not illustrated in FIG. 2, extend toward one side in the axial direction of the motor section 12 (see also FIG. 3A, FIG. 4A and FIG. 5A).

As illustrated in FIG. 1, the circuit section 14 is disposed alongside the motor section 12 as viewed in the axial direction of the motor section 12. The circuit section 14 includes a circuit case 36, and a control board 38 housed inside the circuit case 36.

There are, for example, four of the plural terminals 16A to 16D. Each of the terminals 16A to 16D is formed from sheet metal of an electrically conductive metal material. One end of each of the terminals 16A to 16D is connected to the control board 38, and a clamp portion 40 is formed to the other end of each of the terminals 16A to 16D. Terminal-end portions 34U1 to 34W2 of the plural windings 24U, 24V, 24W are clamped by each of the respective clamp portions 40, thereby wiring the control board 38 to the terminal-end portions 34U1 to 34W2 of the plural windings 24U, 24V, 24W by the plural terminals 16A to 16D.

The plural windings 24U, 24V, 24W illustrated in FIG. 2 to FIG. 5B are configured as delta wiring. The winding method of all the plural windings 24U, 24V, 24W to the plural teeth has been devised as set out below, such that, as illustrated in FIG. 1, each of the terminal-end portions 34U1 to 34W2 is disposed further to the circuit section 14 side (the arrow X1 side, one side in a direction orthogonal to the motor section 12 axial direction) than a central axis C of the motor section 12.

Explanation follows regarding the winding method of the plural windings 24U, 24V, 24W to each of the teeth.

Figure 3A:
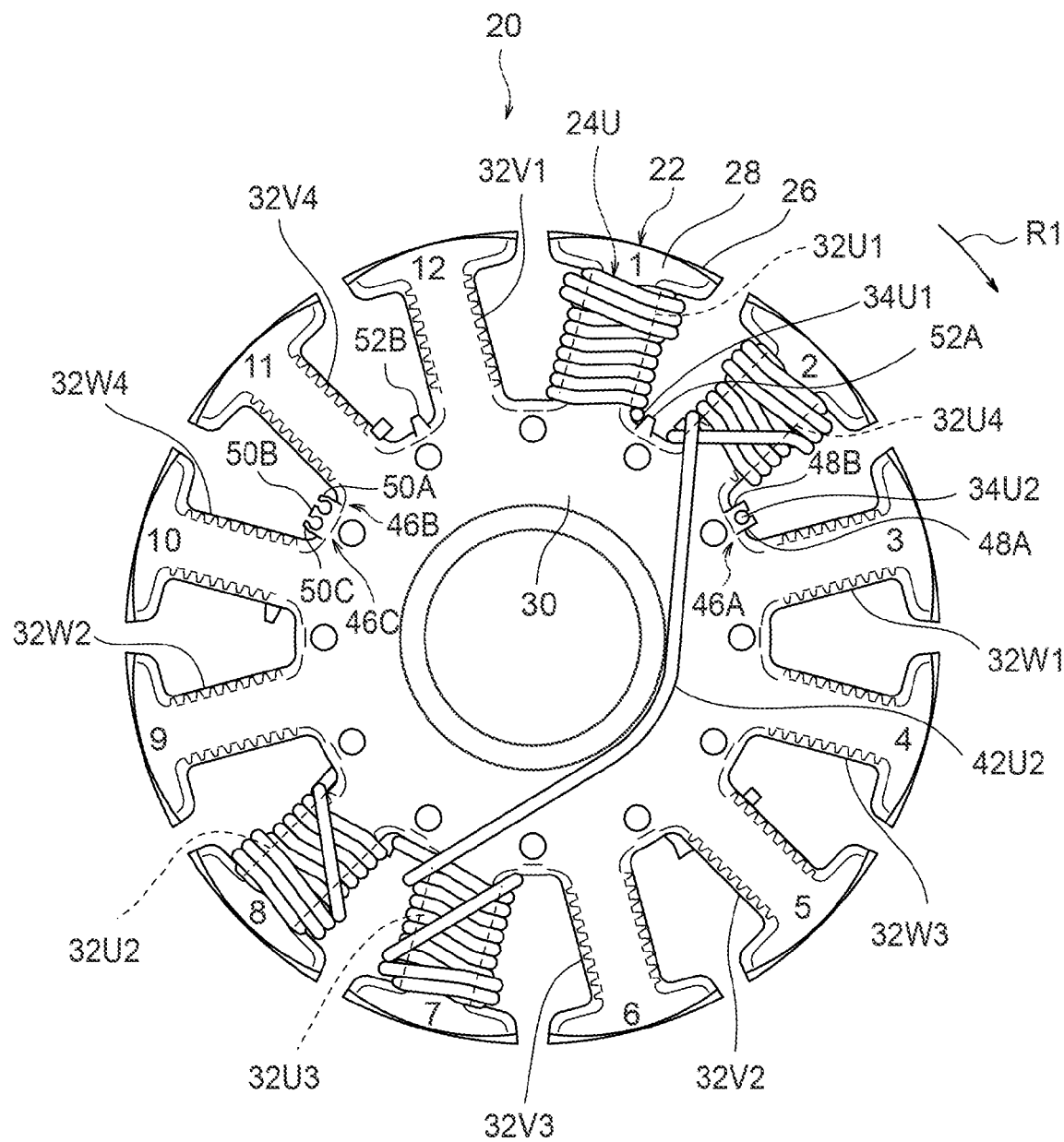
FIG. 3A is a plan view illustrating a state in which a U-phase winding is wound on a stator.

First, as illustrated in FIG. 3A, the plural teeth 32U1 to 32W4 will be referred to as a $1^{st}$ tooth to a $12^{th}$ tooth, in sequence toward one side in a circumferential direction (an arrow R1 side) of the stator 20. Namely, the numbers of the plural teeth 32U1 to 32W4 are as listed below. The numbers 1 to 12 are assigned to the teeth illustrated in FIG. 3A to FIG. 5B.

| | | |
|---|---|---|
| (1) | U-phase tooth 32U1 | $1^{st}$ tooth |
| (2) | U-phase tooth 32U4 | $2^{nd}$ tooth |
| (3) | W-phase tooth 32W1 | $3^{rd}$ tooth |
| (4) | W-phase tooth 32W3 | $4^{th}$ tooth |
| (5) | V-phase tooth 32V2 | $5^{th}$ tooth |
| (6) | V-phase tooth 32V3 | $6^{th}$ tooth |
| (7) | U-phase tooth 32U3 | $7^{th}$ tooth |
| (8) | U-phase tooth 32U2 | $8^{th}$ tooth |
| (9) | W-phase tooth 32W2 | $9^{th}$ tooth |
| (10) | W-phase tooth 32W4 | $10^{th}$ tooth |
| (11) | V-phase tooth 32V4 | $11^{th}$ tooth |
| (12) | V-phase tooth 32V1 | $12^{th}$ tooth |

Figure 3B:
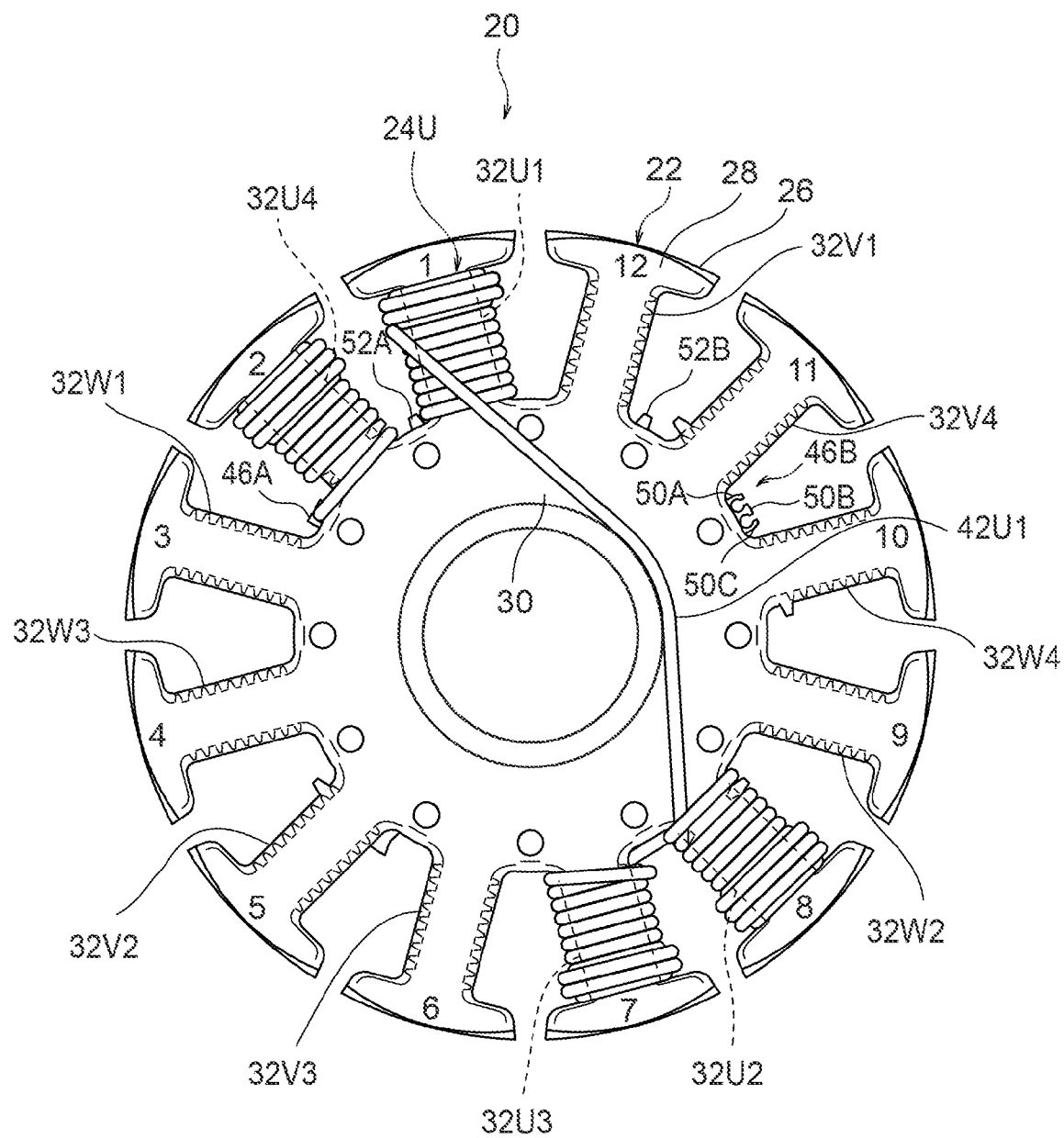
FIG. 3B is bottom view illustrating a state in which a U-phase winding is wound on a stator.

The U-phase winding 24U that serves as the first phase is wound on the $1^{st}$ tooth 32U1, the $8^{th}$ tooth 32U2, the $7^{th}$ tooth 32U3, and the $2^{nd}$ tooth 32U4 in the following manner. Namely, as illustrated in FIG. 3A, the terminal-end portion 34U1, that is the winding start of the winding 24U, is disposed between the $1^{st}$ tooth 32U1 and the $2^{nd}$ tooth 32U4. When this is performed, the terminal-end portion 34U1, that is the winding start of the winding 24U, is disposed to extend toward one side in the axial direction of the stator 20 (referred to below simply as the axial direction when no separate distinction is required). Then, as illustrated in FIG. 3A and FIG. 3B, the winding 24U is wound on the $1^{st}$ tooth 32U1 in a counterclockwise direction, as viewed from the leading end side thereof (the core main body 26 side; the same applies below). Then, as illustrated in FIG. 3B, a portion of the winding 24U configuring a crossover wire 42U1 is pulled out at another side in the axial direction and is routed to the $8^{th}$ tooth 32U2, passing the circular ring portion 30.

After being wound on the $8^{th}$ tooth 32U2 in a counterclockwise direction, as viewed from the leading end side thereof, the winding 24U is then wound on the $7^{th}$ tooth 32U3 in a clockwise direction, as viewed from the leading end side thereof. Then, as illustrated in FIG. 3A, a portion of the winding 24U configuring a crossover wire 42U2 is pulled out at the one side in the axial direction and is routed to the $2^{nd}$ tooth 32U4, passing the circular ring portion 30e. The winding 24U is then wound on the $2^{nd}$ tooth in a clockwise direction, as viewed from the leading end side thereof. The terminal-end portion 34U2, that is the winding finish of the winding 24U, is disposed between the $2^{nd}$ tooth 32U4 and the $3^{rd}$ tooth 32W1. When this is performed, the terminal-end portion 34U2, that is the winding finish of the winding 24U, is disposed to extend toward the one side in the axial direction. The U-phase winding 24U is accordingly wound on the $1^{st}$ tooth 32U1, the $8^{th}$ tooth 32U2, the $7^{th}$ tooth 32U3, and the $2^{nd}$ tooth 32U4.

The winding 24V of the V-phase that serves as the second phase is then wound on the $12^{th}$ tooth 32V1, the $5^{th}$ tooth 32V2, the $6^{th}$ tooth 32V3 and the $11^{th}$ tooth 32V4 in the following manner. Namely, as illustrated in FIG. 4A, the terminal-end portion 34V1, that is the winding start of the winding 24V, is disposed between the $12^{th}$ tooth 32V1 and the $11^{th}$ tooth 32V4. When this is performed, the terminal-end portion 34V1, that is the winding start of the winding 24V, is disposed to extend toward the one side in the axial direction. Then, as illustrated in FIG. 4A and FIG. 4B, the winding 24V is wound on the $12^{th}$ tooth 32V1 in a clockwise direction, as viewed from the leading end side thereof. Then, as illustrated in FIG. 4B, a portion of the winding 24V configuring a crossover wire 42V1 is pulled out at the other side in the axial direction and is routed to the 5$^{th}$ tooth 32V2, passing the circular ring portion 30.

After being wound on the 5$^{th}$ tooth 32V2 in a clockwise direction, as viewed from the leading end side thereof, the winding 24V is wound on the 6$^{th}$ tooth 32V3 in a counterclockwise direction, as viewed from the leading end side thereof. Then, as illustrated in FIG. 4A, a portion of the winding 24V configuring a crossover wire 42V2 is pulled out at the one side in the axial direction and is routed to 11$^{th}$ tooth 32V4, passing the circular ring portion 30. The winding 24V is then wound on the 1$^{th}$ tooth 32V4 in a counterclockwise direction, as viewed from the leading end side thereof. The terminal-end portion 34V2, that is the winding finish of the winding 24V, is disposed between the 11$^{th}$ tooth 32V4 and the 10$^{th}$ tooth 32W4. When this is performed, the terminal-end portion 34V2, that is the winding finish of the winding 24V, is disposed to extend toward the one side in the axial direction. The V-phase winding 24V is accordingly wound on the 12$^{th}$ tooth 32V1, the 5$^{th}$ tooth 32V2, the 6$^{th}$ tooth 32V3, and the 11$^{th}$ tooth 32V4.

The winding 24W of the W-phase that serves as the third phase is then wound on the 3$^{rd}$ tooth 32W1, the 9$^{th}$ tooth 32W2, the 4$^{th}$ tooth 32W3, and the 10$^{th}$ tooth 32W4. Namely, as illustrated in FIG. 5A, the terminal-end portion 34W1, that is the winding start of the winding 24W, is disposed between the 2$^{nd}$ tooth 32U4 and the 3$^{rd}$ tooth 32W1. When this is performed, the terminal-end portion 34W1, that is the winding start of the winding 24W, is disposed to extend toward the one side in the axial direction. Then, as illustrated in FIG. 5A and FIG. 5B, the winding 24W is wound on the 3$^{rd}$ tooth 32W1 in a clockwise direction, as viewed from the leading end side thereof. Then, as illustrated in FIG. 5A, a portion of the winding 24W configuring a first (a first time) crossover wire 42W1 is pulled out at the one side in the axial direction and is routed to the 9$^{th}$ tooth 32W2, passing the circular ring portion 30.

The winding 24W is then wound on the 9$^{th}$ tooth 32W2 in a counterclockwise direction, as viewed from the leading end side thereof. Then, a portion of the winding 24W configuring a second (a second time) crossover wire 42W2 is pulled out at the one side in the axial direction and is routed to the 4$^{th}$ tooth 32W3, passing the circular ring portion 30.

The winding 24W is then wound on the 4$^{th}$ tooth 32W3 in a counterclockwise direction, as viewed from the leading end side thereof. Then, as illustrated in FIG. 5B, a portion of the winding 24W configuring a crossover wire 42W3 is pulled out at the other side in the axial direction and is routed to the 10$^{th}$ tooth 32W4, passing the circular ring portion 30. The winding 24W is then wound on the 10$^{th}$ tooth 32W4 in a clockwise direction, as viewed from the leading end side thereof. The terminal-end portion 34W2, that is the winding finish of the winding 24W, is then disposed between the 10$^{th}$ tooth 32W4 and the 11$^{th}$ tooth 32V4. When this is performed, the terminal-end portion 34W2, that is the winding finish of the winding 24W, is disposed to extend toward the one side in the axial direction. The W-phase winding 24W is accordingly wound on the 3$^{rd}$ tooth 32W1, the 9$^{th}$ tooth 32W2, the 4$^{th}$ tooth 32W3, and the 10$^{th}$ tooth 32W4.

In the stator 20, the 1$^{st}$ tooth 32U1, the 2$^{nd}$ tooth 32U4, the 3$^{rd}$ tooth 32W1, the 10$^{th}$ tooth 32W4, the 11$^{th}$ tooth 32V4, and the 12$^{th}$ tooth 32V1 are disposed further to the circuit section 14 side (the arrow X1 side) than the central axis C of the motor section 12, illustrated in FIG. 1. Each of the terminal-end portions 34U1 to 34W2 is accordingly disposed further to the circuit section 14 side than the central axis C of the motor section 12, as illustrated in FIG. 1.

Figure 11A:
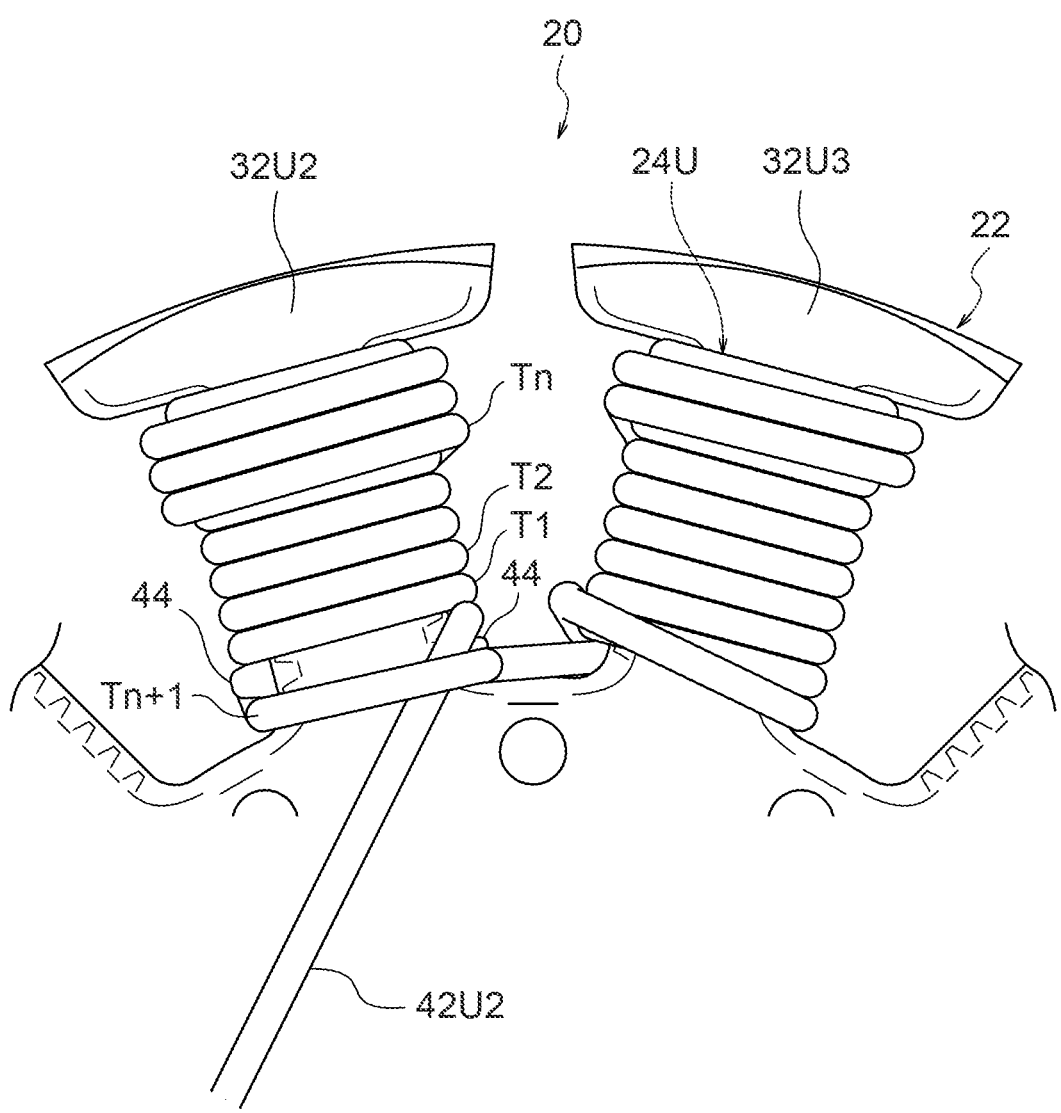
FIG. 11A is an enlarged plan view of relevant portions illustrating a state in which a U-phase winding is wound on a stator.
Figure 11B:
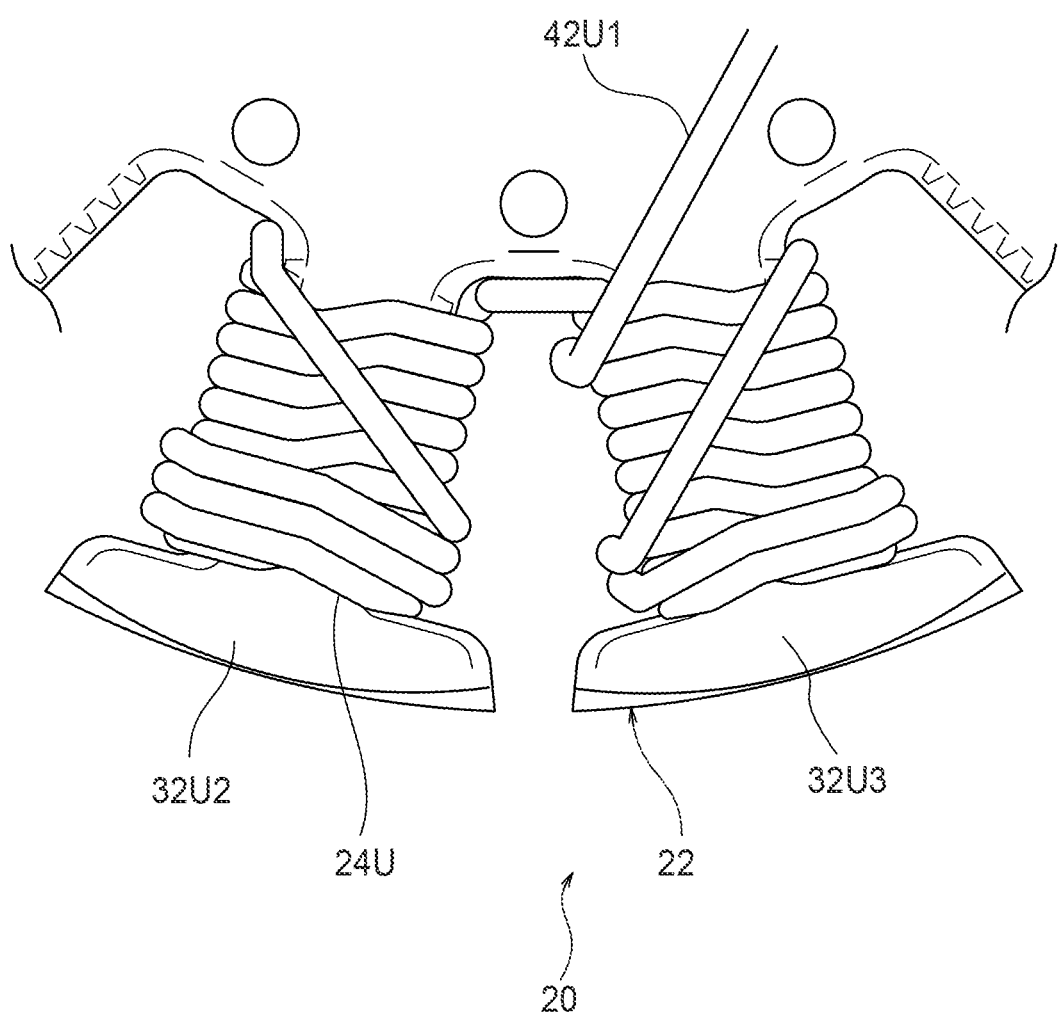
FIG. 11B is an enlarged bottom view of relevant portions illustrating a state in which a U-phase winding is wound on a stator.
Figure 12:
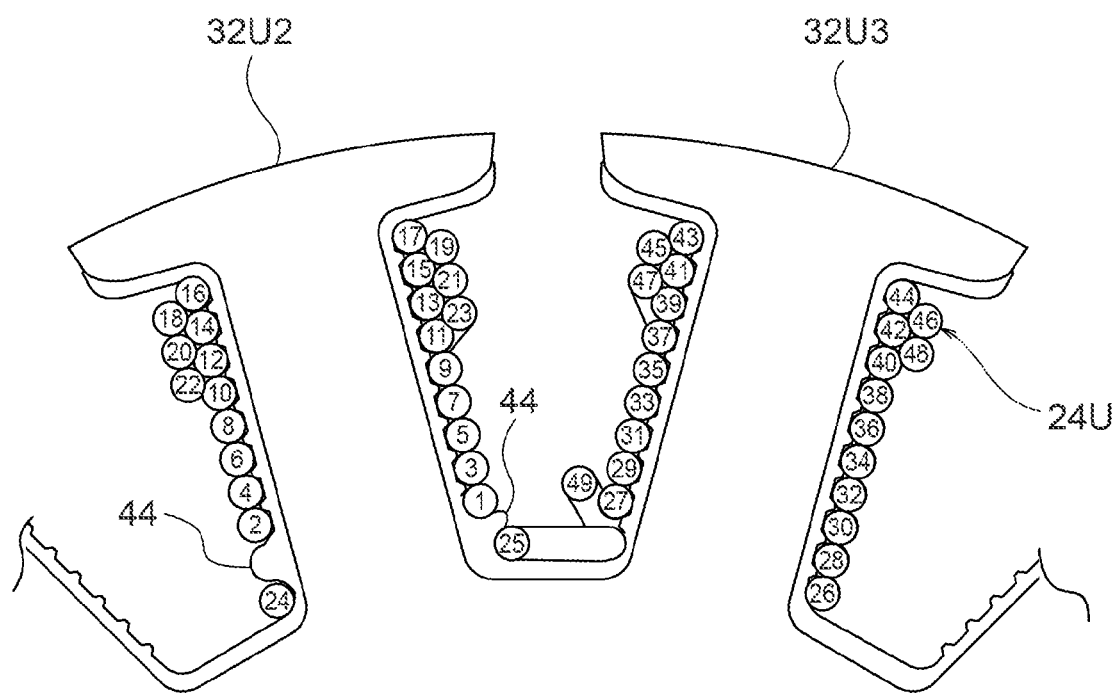
FIG. 12 is an explanatory drawing of a method of winding a winding from one to another of adjacent teeth.

The U-phase winding 24U is wound on each of the teeth 32U1 to 32U4 from the base end side thereof (see also FIG. 11A, FIG. 11B). FIG. 12 illustrates in more detail the U-phase winding 24U wound on each of the teeth 32U2, 32U3 from the base end side thereof. Namely, the numbers 1 to 49 given to the cross-section of the winding 24U in FIG. 12 express the winding sequence of the winding 24U. The V-phase winding 24V and the W-phase winding 24W described above are configured similarly to the U-phase winding 24U.

When the windings 24U, 24V, 24W are routed from one adjacent tooth to another adjacent tooth from among the 1$^{st}$ tooth 32U1 to the 12$^{th}$ tooth 32V1, the final transition turn of the winding wound on the one tooth passes nearer to a radial direction inside of the stator 20 than the first turn of the winding wound on the one tooth.

For example, as illustrated in FIG. 11A and FIG. 11B, in the case of the U-phase winding 24U, when the winding 24U is wound from the one to the other of the adjacent teeth 32U2, 32U3, the final transition turn Tn+1 of the winding 24U wound on the one tooth 32U2 passes closer to an inside in the stator 20 radial direction than the first turn T1 of the winding 24U wound on the one tooth 32U2. In FIG. 11A and FIG. 11B, the reference numeral T1 illustrates the 1$^{st}$ turn, and a reference numeral T2 illustrates the 2$^{nd}$ turn. The reference numeral Tn illustrates the final winding turn, and Tn+1 illustrates the final transition turn moving to the next tooth 32U3.

The V-phase winding 24V and the W-phase winding 24W described above are configured similarly to the U-phase winding 24U, such that the final transition turn of the winding wound on the one tooth passes closer to the inside in the stator 20 radial direction than the first turn of the winding wound on the one tooth.

Figure 6:
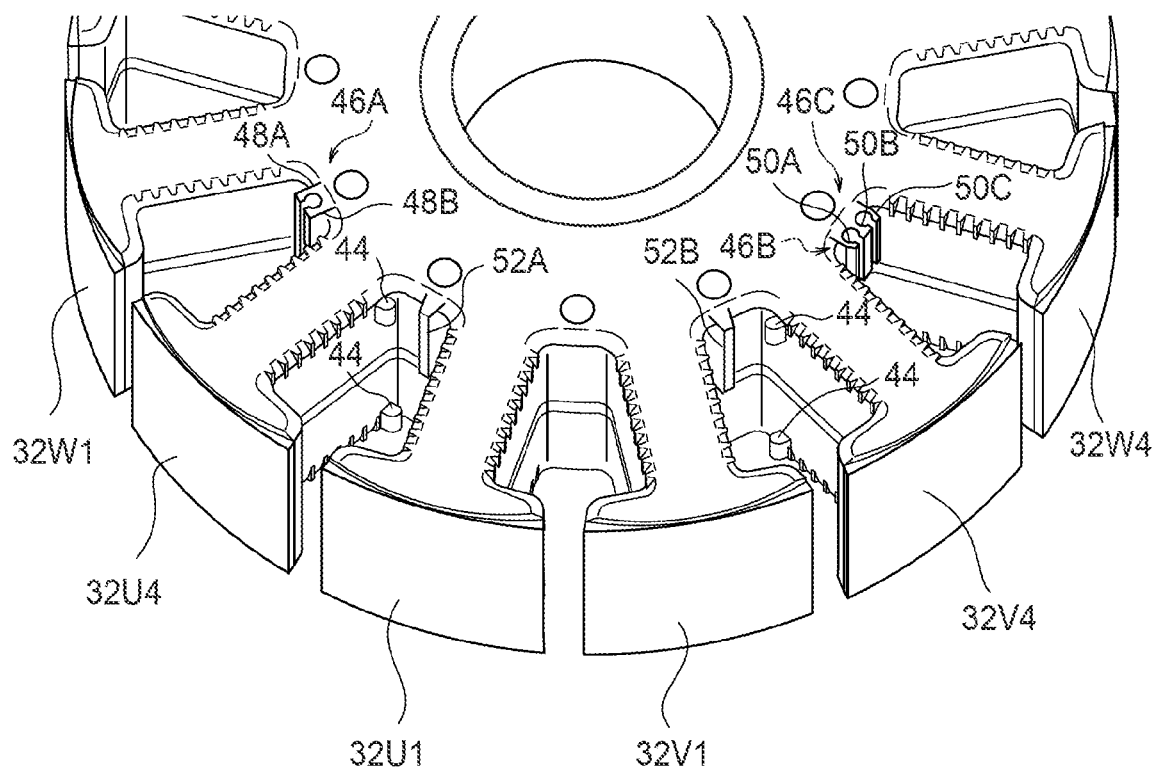
FIG. 6 is an enlarged perspective view of relevant portions of a stator core.

Furthermore, as illustrated in FIG. 6, plural protruding portions 44 are formed to the stator 20. For example, as illustrated in FIG. 11A, a protruding portion 44 for the U-phase winding 24U is formed at the tooth 32U2 out of the adjacent teeth 32U2, 32U3. The protruding portion 44 for the U-phase winding 24U is present between the first turn T1 and the final transition turn Tn+1 of the winding 24U. Other U-phase teeth, the V-phase and W-phase teeth also have a similar configuration.

Moreover, as illustrated in FIG. 6, plural (three) retaining portions 46A to 46C are formed to the stator 20. Each of the retaining portions 46A to 46C is configured with a snap-fit structure. The retaining portion 46A is configured by a pair of retaining tabs 48A, 48B in a row in the stator 20 circumferential direction, and the retaining portions 46B, 46C are configured by three retaining tabs 50A to 50C in a row in the stator 20 circumferential direction. The retaining portion 46B is configured by the retaining tabs 50A, 50B, and the retaining portion 46C is configured by the retaining tabs 50B, 50C. Each of the retaining portions 46A to 46C is formed as a protrusion extending in the stator 20 radial direction. The retaining portion 46A is formed between 2$^{nd}$ tooth 32U4 and the 3$^{rd}$ tooth 32W1, and the retaining portions 46B, 46C are formed between the 10$^{th}$ tooth 32W4 and the 11$^{th}$ tooth 32V4.

Figure 7:
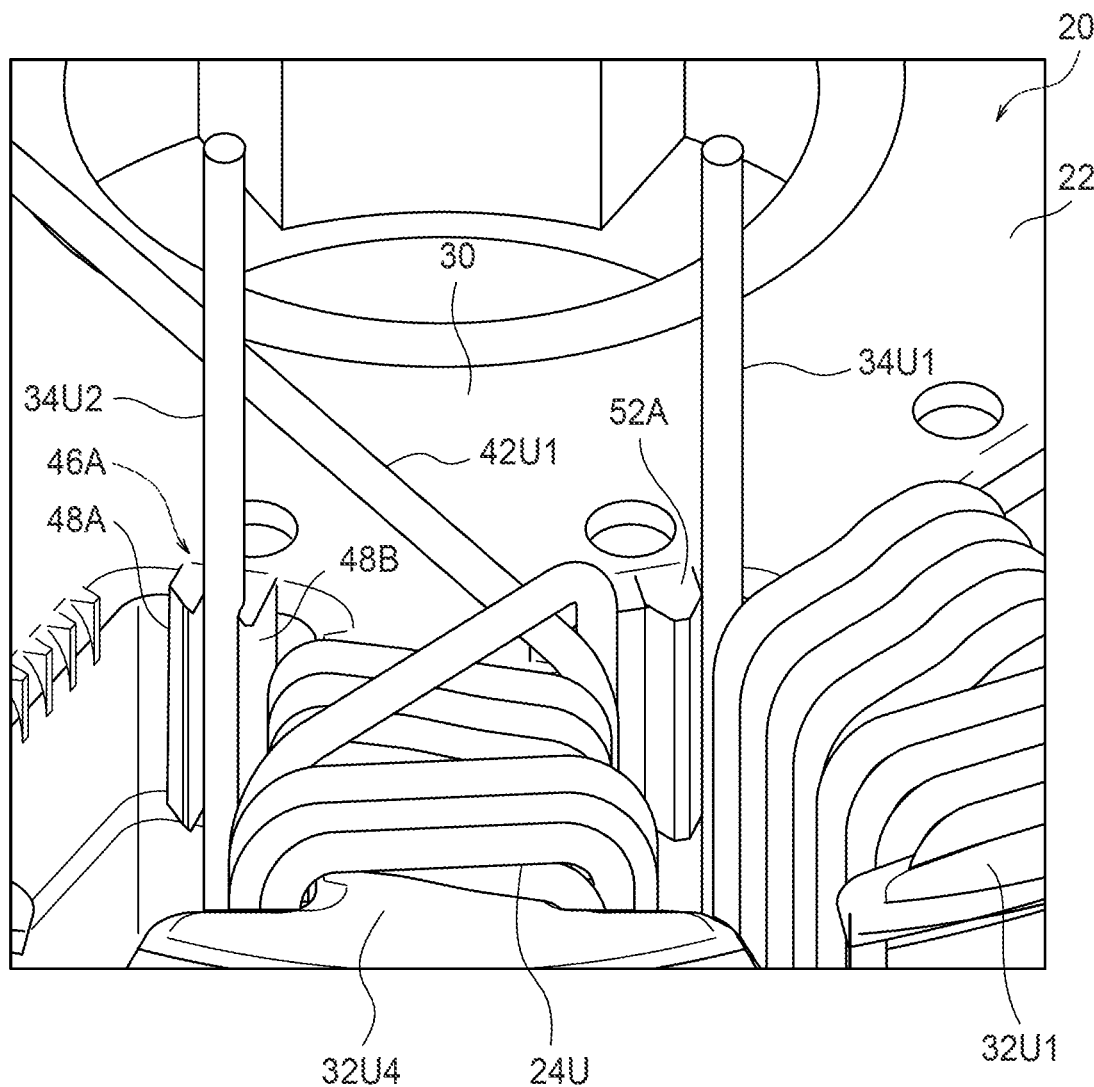
FIG. 7 is an enlarged perspective view of relevant portions of a stator.
Figure 8:
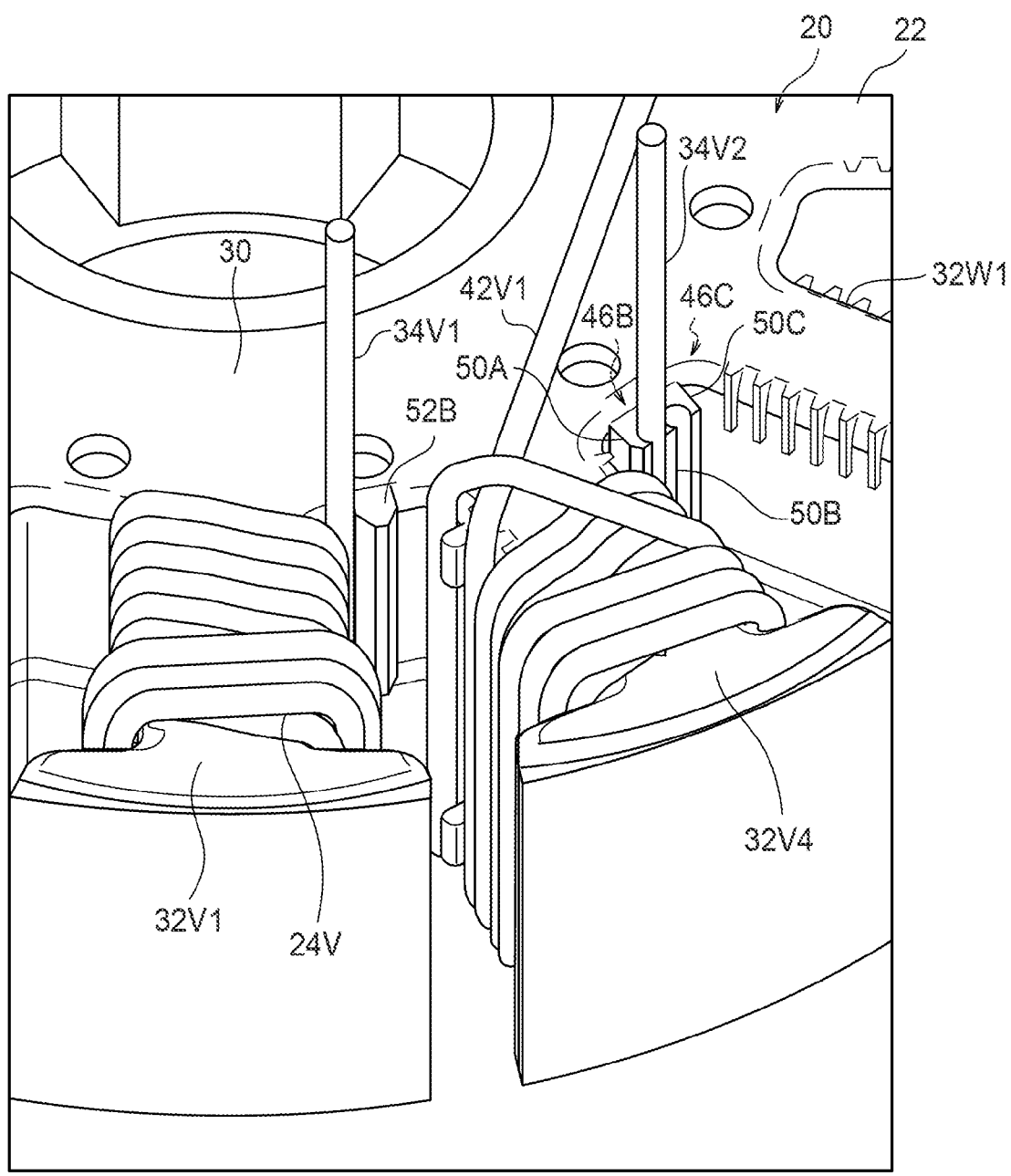
FIG. 8 is an enlarged perspective view of relevant portions of a stator.

As illustrated in FIG. 7, the winding finish terminal-end portion 34U2 of the U-phase winding 24U is configured so as to be clamped between the pair of retaining tabs 48A, 48B and retained by the retaining portion 46A. As illustrated in FIG. 8, the winding finish terminal-end portion 34V2 of the V-phase winding 24V is configured so as to be clamped between the pair of retaining tabs 50A, 50B and retained by the retaining portion 46B. Furthermore, as illustrated in FIG.

10, the winding finish terminal-end portion 34W2 of the W-phase winding 24W is configured so as to be clamped between the pair of retaining tabs 50B, 50C and retained by the retaining portion 46C.

As illustrated in FIG. 6, plural supporting portions 52A, 52B are formed to the stator 20. Each of the supporting portions 52A, 52B is formed as a protrusion extending in the stator 20 radial direction. The supporting portion 52A is disposed between the 1$^{st}$ tooth 32U1 and 2$^{nd}$ tooth 32U4, and is provided in the vicinity of the 1$^{st}$ tooth 32U1 side. The supporting portion 52B is disposed between the 11$^{th}$ tooth 32V4 and the 12$^{th}$ tooth 32V1, and is provided in the vicinity of the 12$^{th}$ tooth 32V1 side.

As illustrated in FIG. 7, the winding start terminal-end portion 34U1 of the U-phase winding 24U is supported by the supporting portion 52A so as to run along the base end portion of the 1$^{st}$ tooth 32U1 (clamped between the base end portion of the 1$^{st}$ tooth 32U1 and the supporting portion 52A). As illustrated in FIG. 8, the winding start terminal-end portion 34V1 of the V-phase winding 24V is supported by the supporting portion 52B so as to run along the base end portion of the 12$^{th}$ tooth 32V1 (clamped between the base end portion of the 12$^{th}$ tooth 32V1 and the supporting portion 52B).

Figure 9:
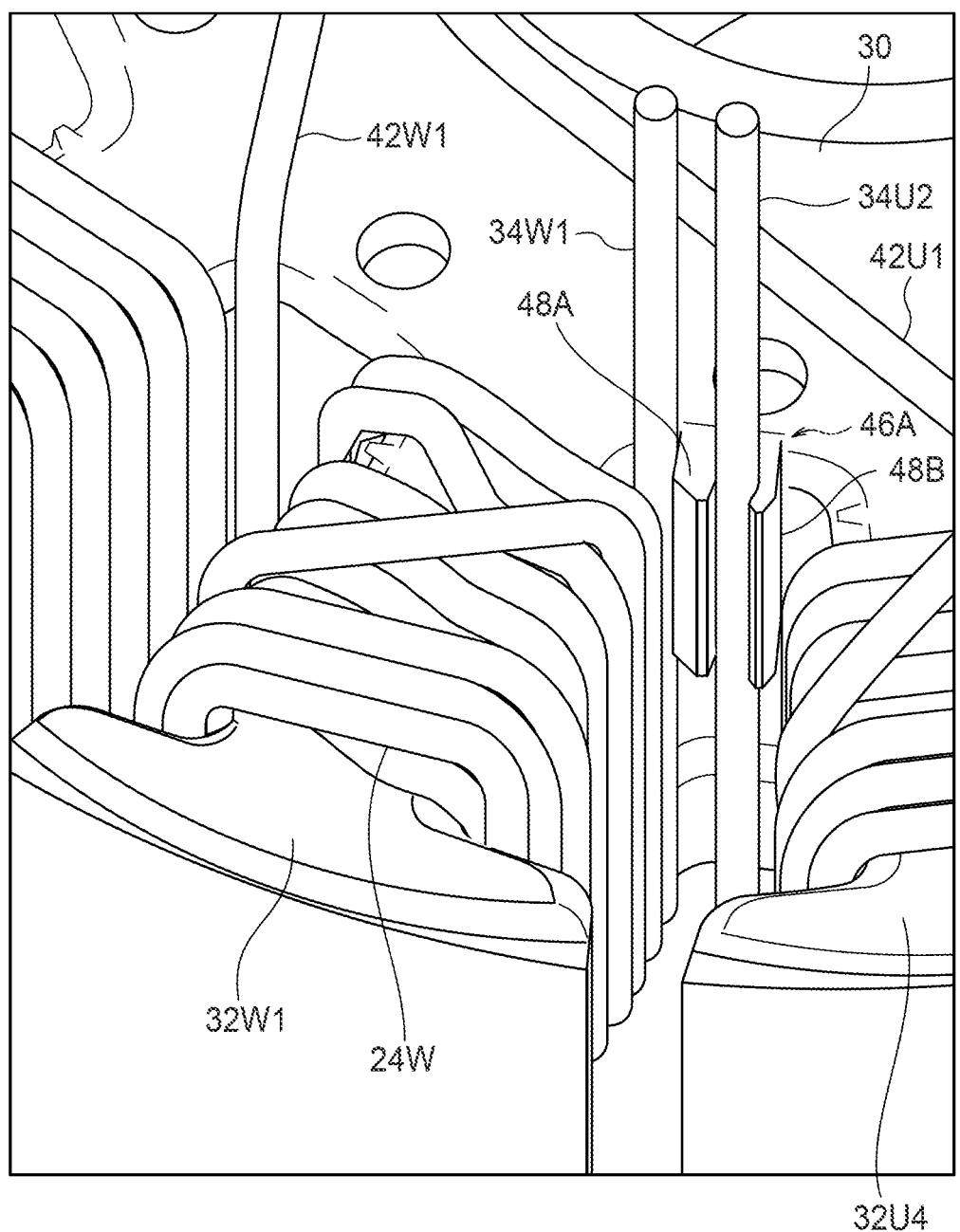
FIG. 9 is an enlarged perspective view of relevant portions of a stator.

Furthermore, as illustrated in FIG. 9, of the pair of retaining tabs 48A, 48B that configure the retaining portion 46A, the one retaining tab 48A also functions as a supporting portion, and the winding start terminal-end portion 34W1 of the W-phase winding 24W is supported by the retaining tab 48A so as to run along a base end portion of the 3$^{rd}$ tooth 32W1 (clamped between the 3$^{rd}$ tooth 32W1 base end portion and the retaining tab 48A).

Explanation now follows regarding operation and advantageous effects of the exemplary embodiment of the present invention.

As described in detail above and as illustrated in FIG. 1, in the rotating electrical device 10 according to the exemplary embodiment of the present invention, all of the plural windings 24U, 24V, 24W of the stator 20 are wound on respective plural teeth 32U1 to 32W4 (see FIG. 5A and FIG. 5B) such that each of the respective terminal-end portions 34U1 to 34W2, configuring the winding starts or winding finishes, are disposed further to the circuit section 14 side (the arrow X1 side) than the central axis C of the motor section 12. As a result, a short length suffices for the terminals 16A to 16D, enabling the yield of the terminals 16A to 16D to be improved. Moreover, the structure of the terminals 16A to 16D for wiring-in the windings 24U, 24V, 24W can be simplified. This thereby enables an increase in cost to be suppressed.

Moreover, when the windings 24U, 24V, 24W are wound from one to another of adjacent teeth out of the 1$^{st}$ tooth 32U1 to the 12$^{th}$ tooth 32V1 illustrated in FIG. 5A, the final transition turn of the winding wound on the one tooth passes closer to the inside in the stator 20 radial direction than the first turn of the winding wound on the one tooth. For example, as illustrated in FIG. 11A and FIG. 11B, in the case of the U-phase winding 24U, when the winding 24U is wound from the one to the other of the adjacent teeth 32U2, 32U3, the final transition turn Tn+1 of the winding 24U wound on the one tooth 32U2 passes closer to the inside in the stator 20 radial direction than the first turn T1 of the winding 24U wound on the one tooth 32U2.

As a result, when the windings 24U, 24V, 24W are wound from the one to the other of adjacent teeth, the winding can easily be wound on from the base end side of the other tooth, leading to good alignment of the winding at the other tooth (the next tooth), and thereby enabling high speed winding of the windings 24U, 24V, 24W.

Moreover, as illustrated in FIG. 6, plural protruding portions 44 are formed to the stator 20. For example, as illustrated in FIG. 12, a protruding portion 44 for the U-phase winding 24U is formed to the one tooth 32U2 out of the adjacent teeth 32U2, 32U3. The protruding portion 44 for the U-phase winding 24U is present between the first turn T1 and the final transition turn Tn+1 of the winding 24U. Protruding portions 44 for the V-phase winding 24V and the W-phase winding 24W are also formed to one of adjacent teeth, and are present between the first turn and the final transition turn of the windings.

Interference between the respective first turns and final transition turns of the windings 24U, 24V, 24W can thereby be suppressed, enabling good alignment of the windings 24U, 24V, 24W at the other tooth (the next tooth) to be achieved.

Moreover, as illustrated in FIG. 6, plural supporting portions 52A, 52B are formed to the stator 20. As illustrated in FIG. 7, the winding start terminal-end portion 34U1 of the U-phase winding 24U is supported by the supporting portion 52A so as to run along the base end portion of the 1$^{st}$ tooth 32U1 (clamped between the base end portion of the 1$^{st}$ tooth 32U1 and the supporting portion 52A). As illustrated in FIG. 8, the winding start terminal-end portion 34V1 of the V-phase winding 24V is supported by the supporting portion 52B so as to run along the base end portion of the 12$^{th}$ tooth 32V1 (clamped between the base end portion of the 12$^{th}$ tooth 32V1 and the supporting portion 52B).

Furthermore, as illustrated in FIG. 9, of the pair of retaining tabs 48A, 48B that configure the retaining portion 46A, the one retaining tab 48A also functions as a supporting portion, and the winding start terminal-end portion 34W1 of the W-phase winding 24W is supported by the retaining tab 48A so as to run along the base end portion of the 3$^{rd}$ tooth 32W1 (clamped between the 3$^{rd}$ tooth 32W1 base end portion and the retaining tab 48A).

As a result, spring-back of the winding start terminal-end portions 34U1, 34V1, 34W1 can be suppressed, and each of the winding start terminal-end portions 34U1, 34V1, 34W1 can be disposed so as to extended in the axial direction of the motor section 12, enabling the windings 24U, 24V, 24W to be easily be wound on from the base end side of the teeth 32U1, 32V1, 32W1.

Figure 10:
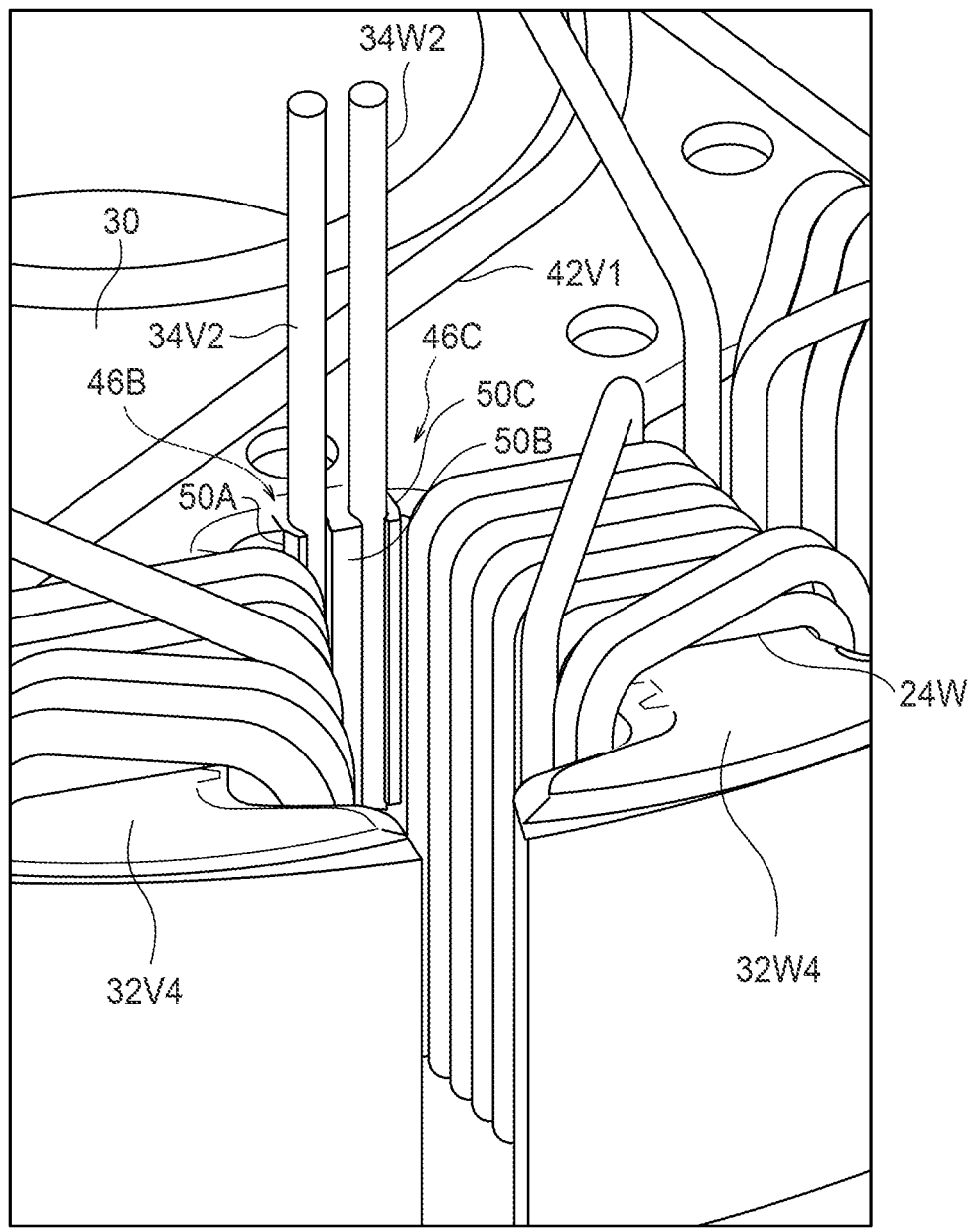
FIG. 10 is an enlarged perspective view of relevant portions of a stator.

Moreover, as illustrated in FIG. 6, plural (three) retaining portions 46A to 46C are formed to the stator 20. As illustrated in FIG. 7, the winding finish terminal-end portion 34U2 of the U-phase winding 24U is configured so as to be clamped between the pair of retaining tabs 48A, 48B and retained by the retaining portion 46A. As illustrated in FIG. 8, the winding finish terminal-end portion 34V2 of the V-phase winding 24V is configured so as to be clamped between the pair of retaining tabs 50A, 50B and retained by the retaining portion 46B. Furthermore, as illustrated in FIG. 10, the winding finish terminal-end portion 34W2 of the W-phase winding 24W is configured so as to be clamped between the pair of retaining tabs 50B, 50C and retained by the retaining portion 46C.

As a result, spring-back of the winding finish terminal-end portions 34U2, 34V2, 34W2 can be suppressed, and each of the winding finish terminal-end portions 34U2, 34V2, 34W2 can be disposed extending in the axial direction of the motor section 12.

Explanation follows regarding modified examples of the exemplary embodiment of the present invention.

In the present exemplary embodiment, the motor section 12 is, for example, a 10-pole, 12-slot outer-rotor brushless motor; however, the motor section 12 may also be a 14-pole, 12-slot outer-rotor brushless motor.

Moreover, in the stator core 22, the windings 24U, 24V, 24W are wound in the sequence of U-phase, V-phase, W-phase; however the plural windings 24U, 24V, 24W may be wound to the stator core 22 in another sequence. Namely, winding may start from any one of the U-phase, the V-phase or the W-phase out of the first phase to the third phase.

Moreover, in the present exemplary embodiment, besides the configuration described above, the W-phase winding 24W that serves as the third phase may also be wound as follows. A first modified example and a second modified example of a wind-on method of the W-phase winding 24W are given below.

Figure 13A:
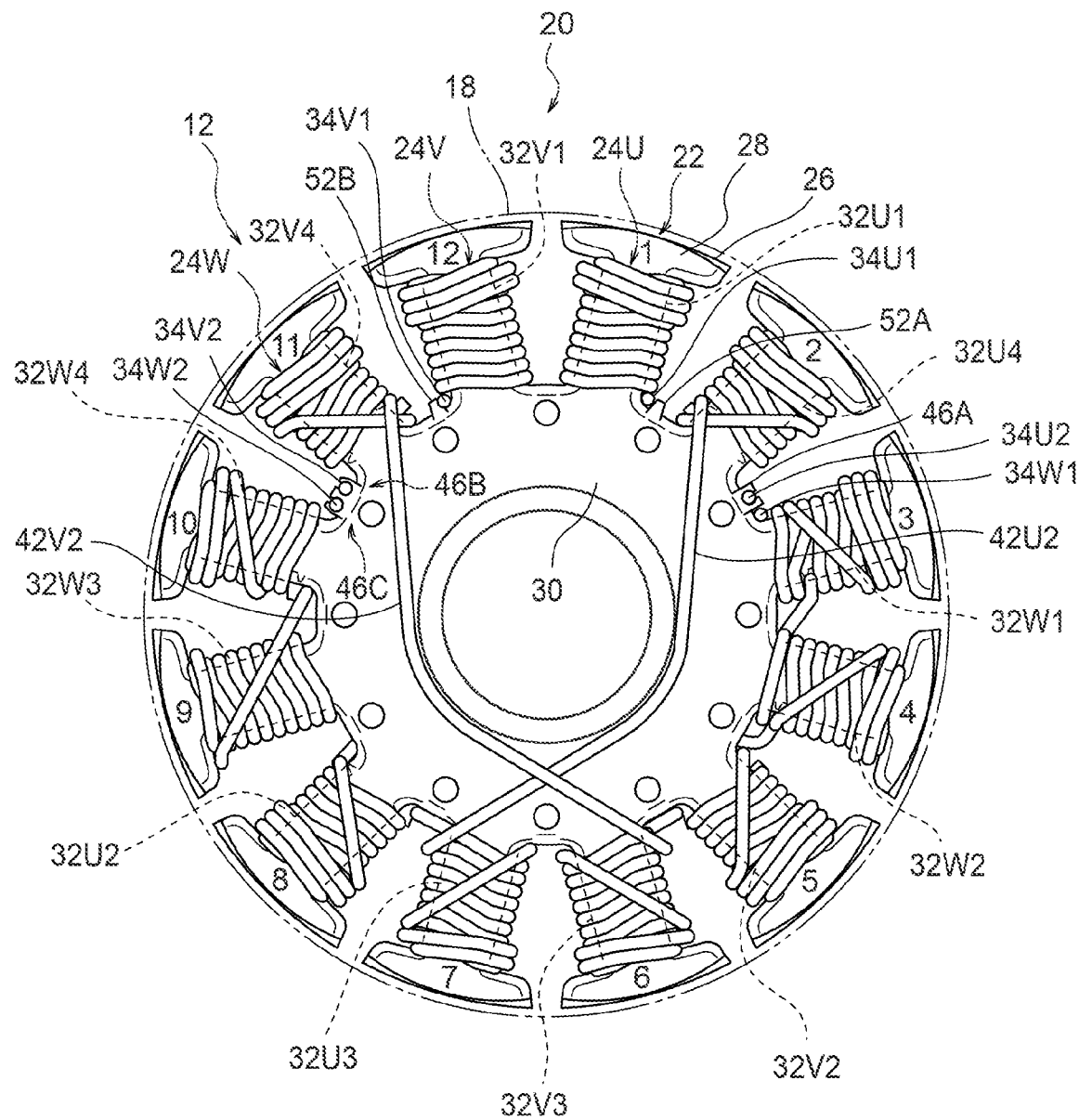
FIG. 13A is a plan view illustrating a first modified example of a winding method of a W-phase winding.
Figure 13B:
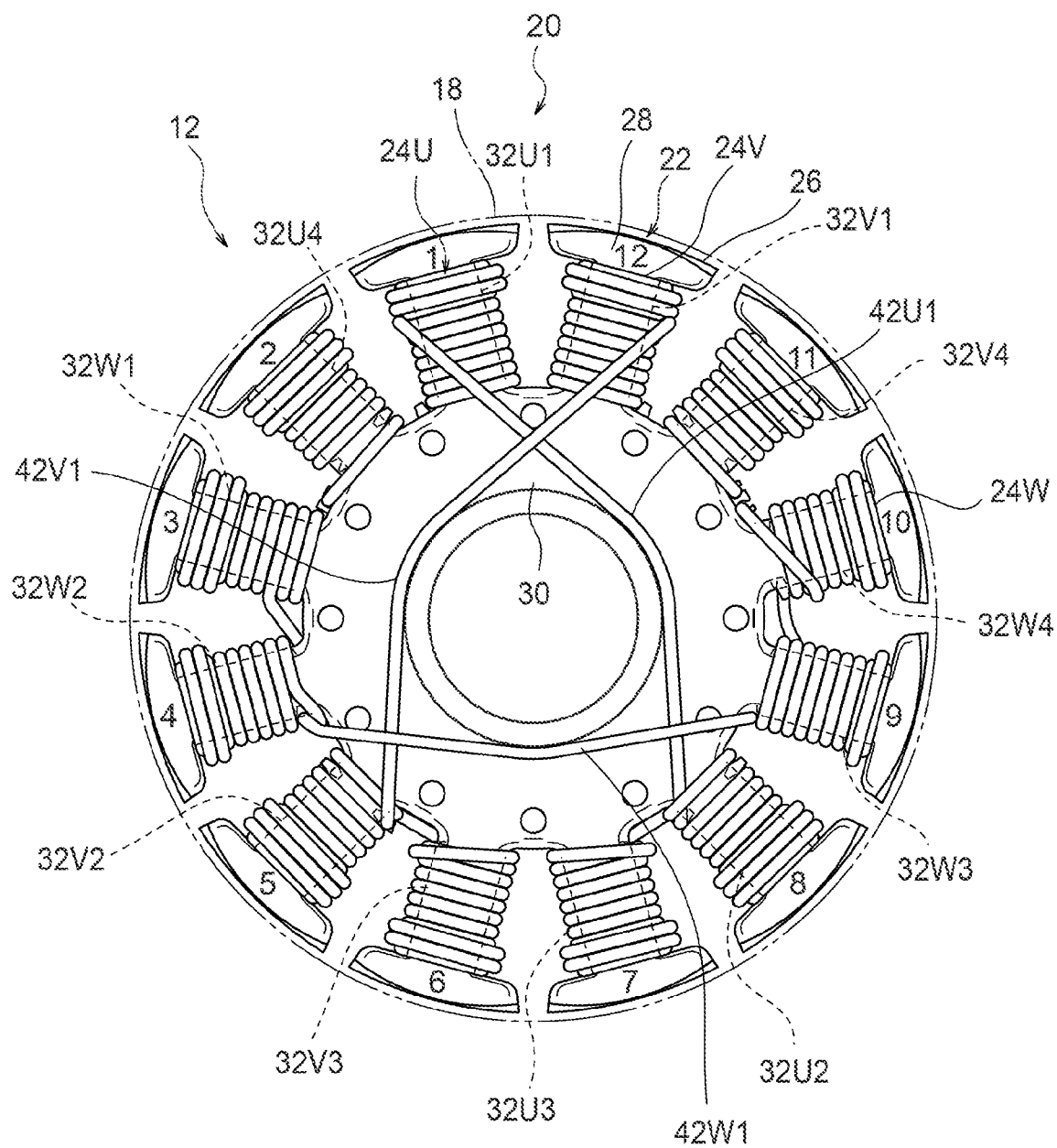
FIG. 13B is a bottom view illustrating the first modified example of the winding method of the W-phase winding.

In the first modified example of the wind-on method of the W-phase winding 24W illustrated in FIG. 13A and FIG. 13B, the numbers of the W-phase teeth 32W2 and 32W3 have changed. Numbers 1 to 12 are assigned to the teeth illustrated in FIG. 13A and FIG. 13B.

| (1) | U-phase tooth 32U1 | $1^{st}$ tooth |
| (2) | U-phase tooth 32U4 | $2^{nd}$ tooth |
| (3) | W-phase tooth 32W1 | $3^{rd}$ tooth |
| (4) | W-phase tooth 32W2 | $4^{th}$ tooth |
| (5) | V-phase tooth 32V2 | $5^{th}$ tooth |
| (6) | V-phase tooth 32V3 | $6^{th}$ tooth |
| (7) | U-phase tooth 32U3 | $7^{th}$ tooth |
| (8) | U-phase tooth 32U2 | $8^{th}$ tooth |
| (9) | W-phase tooth 32W3 | $9^{th}$ tooth |
| (10) | W-phase tooth 32W4 | $10^{th}$ tooth |
| (11) | V-phase tooth 32V4 | $11^{th}$ tooth |
| (12) | V-phase tooth 32V1 | $12^{th}$ tooth |

In the modified example as illustrated in FIG. 13A, the winding start terminal-end portion 34W1 of the winding 24W is disposed between the $2^{nd}$ tooth 32U4 and the $3^{rd}$ tooth 32W1. When this is performed, the terminal-end portion 34W1, that is the winding start of the winding 24W, is disposed to extend toward the one side in the axial direction. Then, as illustrated in FIG. 13A and FIG. 13B, the winding 24W is wound on the $3^{rd}$ tooth 32W1 in a clockwise direction, as viewed from the leading end side thereof. Then, the winding 24W is wound on the $4^{th}$ tooth 32W2 in a counterclockwise direction, as viewed from the leading end side thereof. Then, as illustrated in FIG. 13B, the portion of the winding 24W configuring the crossover wire 42W1 is pulled out at the other side in the axial direction and is routed to the $9^{th}$ tooth 32W3, passing the circular ring portion 30.

Next, as illustrated in FIG. 13A and FIG. 13B, the winding 24W is wound on the $9^{th}$ tooth 32W3 in a counterclockwise direction, as viewed from the leading end side thereof. The winding 24W is then wound on the $10^{th}$ tooth 32W4 in a clockwise direction, as viewed from the leading end side thereof. The terminal-end portion 34W2, that is the winding finish of the winding 24W, is then disposed between the $10^{th}$ tooth 32W4 and the $11^{th}$ tooth 32V4. When this is performed, the terminal-end portion 34W2, that is the winding finish of the winding 24W, is disposed to extend toward the one side in the axial direction. In the present modified example, the W-phase winding 24W is accordingly wound on the $3^{rd}$ tooth 32W1, the $4^{th}$ tooth 32W2, the $9^{th}$ tooth 32W3 and the $10^{th}$ tooth 32W4.

Also when the W-phase winding 24W is wound on each of the teeth in this manner, each of the respective terminal-end portions 34U1 to 34W2 of all of the plural windings 24U, 24V, 24W can be disposed further to the circuit section 14 side than the central axis C of the motor section 12, as illustrated in FIG. 1.

Moreover, in the modified example illustrated in FIG. 13A and FIG. 13B, one crossover wire (the crossover wire 42W1 illustrated in FIG. 13B only) is sufficient for the W-phase winding 24W, enabling the overall length of the W-phase winding 24W to be shortened, and hence enabling a reduction in cost.

Figure 14A:
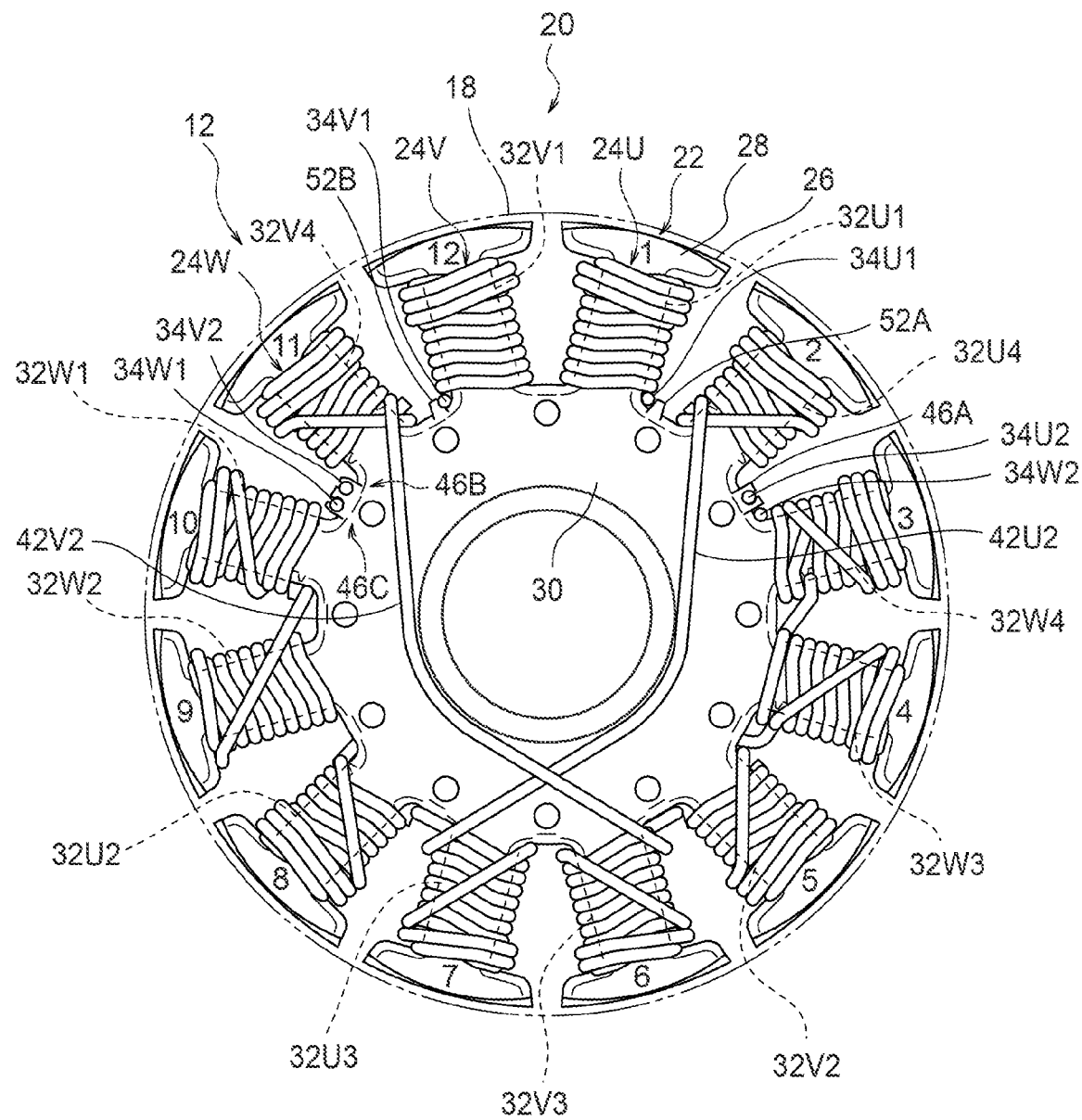
FIG. 14A is a plan view illustrating a second modified example of a winding method of a W-phase winding.
Figure 14B:
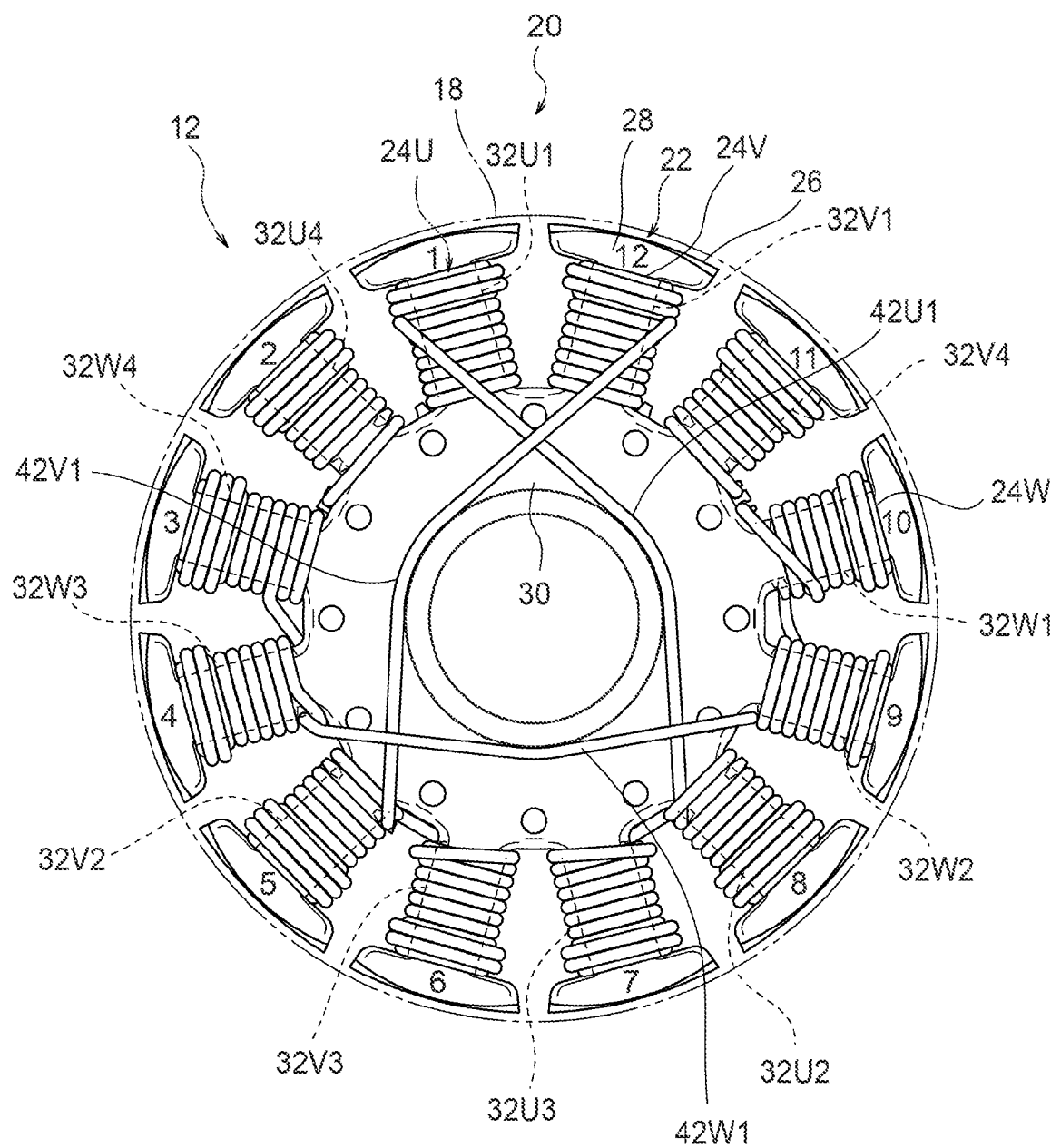
FIG. 14B is a bottom view illustrating the second modified example of the winding method of the W-phase winding.

In the $2^{nd}$ modified example of the wind-on method of the W-phase winding 24W illustrated in FIG. 14A and FIG. 14B, the numbers of the W-phase teeth 32W1 and 32W4 have changed. Numbers 1 to 12 are assigned to the teeth illustrated in FIG. 14A and FIG. 14B.

| (1) | U-phase tooth 32U1 | $1^{st}$ tooth |
| (2) | U-phase tooth 32U4 | $2^{nd}$ tooth |
| (3) | W-phase tooth 32W4 | $3^{rd}$ tooth |
| (4) | W-phase tooth 32W3 | $4^{th}$ tooth |
| (5) | V-phase tooth 32V2 | $5^{th}$ tooth |
| (6) | V-phase tooth 32V3 | $6^{th}$ tooth |
| (7) | U-phase tooth 32U3 | $7^{th}$ tooth |
| (8) | U-phase tooth 32U2 | $8^{th}$ tooth |
| (9) | W-phase tooth 32W2 | $9^{th}$ tooth |
| (10) | W-phase tooth 32W1 | $10^{th}$ tooth |
| (11) | V-phase tooth 32V4 | $11^{th}$ tooth |
| (12) | V-phase tooth 32V1 | $12^{th}$ tooth |

In the modified example as illustrated in FIG. 14A, the winding start terminal-end portion 34W1 of the winding 24W is disposed between the $10^{th}$ tooth 32W1 and the $11^{th}$ tooth 32V4. When this is performed, the terminal-end portion 34W1, that is the winding start of the winding 24W, is disposed to extend toward the one side in the axial direction. Then, as illustrated in FIG. 14A and FIG. 14B, the winding 24W is wound on $10^{th}$ tooth 32W1 in a counterclockwise direction, as viewed from the leading end side thereof. Then, the winding 24W is wound on the $9^{th}$ tooth 32W2 in a clockwise direction, as viewed from the leading end side thereof. Then, as illustrated in FIG. 14B, the portion of the winding 24W configuring the crossover wire 42W1 is pulled out at the other side in the axial direction and is routed to the $4^{th}$ tooth 32W3, passing the circular ring portion 30.

Next, as illustrated in FIG. 14A and FIG. 14B, the winding 24W is wound on the $4^{th}$ tooth 32W3 in a clockwise direction, as viewed from the leading end side thereof. The winding 24W is then wound on the $3^{rd}$ tooth 32W4 in a counterclockwise direction, as viewed from the leading end side thereof. The terminal-end portion 34W2, that is the winding finish of the winding 24W, is then disposed between the $2^{nd}$ tooth 32U4 and the $3^{rd}$ tooth 32W4. When this is performed, the terminal-end portion 34W2, that is the winding finish of the winding 24W, is disposed to extend toward the one side in the axial direction. In the present modified example, the W-phase winding 24W is accordingly wound on the $10^{th}$ tooth 32W1, the $9^{th}$ tooth 32W2, the $4^{th}$ tooth 32W3 and the $3^{rd}$ tooth 32W4.

Also when the W-phase winding 24W is wound on each of the teeth in this manner, each of the respective terminal-end portions 34U1 to 34W2 of all of the plural windings 24U, 24V, 24W can be disposed further to the circuit section 14 side than the central axis C of the motor section 12. Note that the positions of the winding start terminal-end portion 34W1 and the winding finish terminal-end portion 34W2 of the winding 24W illustrated in FIG. 14A and FIG. 14B are switched, with respect to the positions of the winding start terminal-end portion 34W1 and the winding finish terminal-end portion 34W2 of the winding 24W illustrated in FIG. 1.

In the modified example illustrated in FIG. 14A and FIG. 14B, one crossover wire (only the crossover wire 42W1 illustrated in FIG. 14B) is sufficient for the W-phase winding 24W, enabling the overall length of the W-phase winding 24W to be shortened, and hence enabling a reduction in cost.

Moreover, in the modified example illustrated in FIG. 14A and FIG. 14B, the winding direction of the winding 24U on the $2^{nd}$ tooth 32U4, that is the final tooth of the U-phase, is the same (clockwise, as viewed from the tooth leading end side) as the winding direction of the winding 24V on the $12^{th}$ tooth 32V1, that is the first tooth of the next V-phase. Similarly, the winding direction of the winding 24V on the $11^{th}$ tooth 32V4, that is the final tooth of the V-phase, is the same (counterclockwise, as viewed from the tooth leading end side) as the winding direction of the winding 24W on the $10^{th}$ tooth 32W1, that is the first tooth of the next W-phase.

Figure 15A:
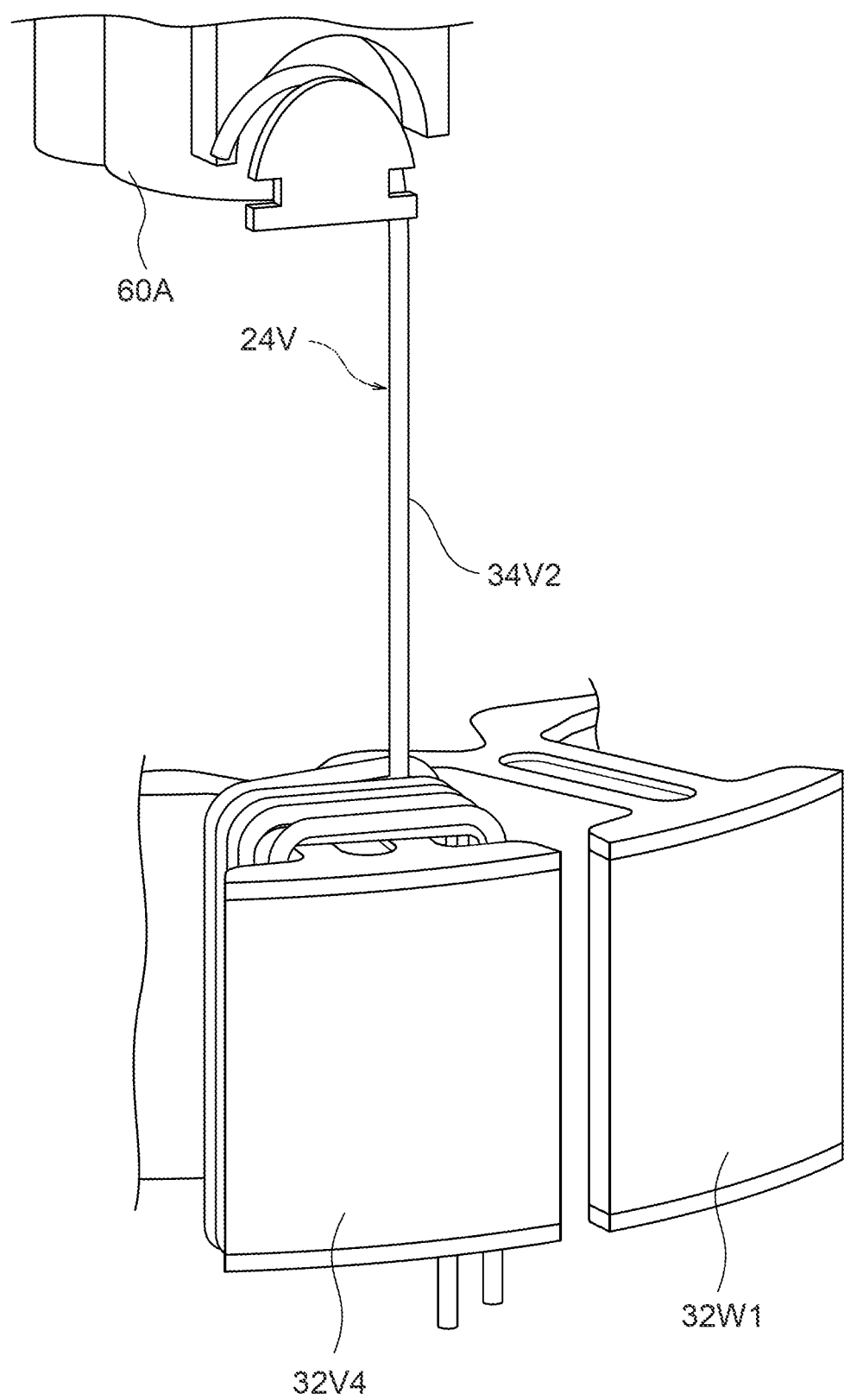
FIG. 15A is a perspective view illustrating a state in which a winding start end portion of the W-phase winding is retained by a retaining jig in the second modified example.
Figure 15B:
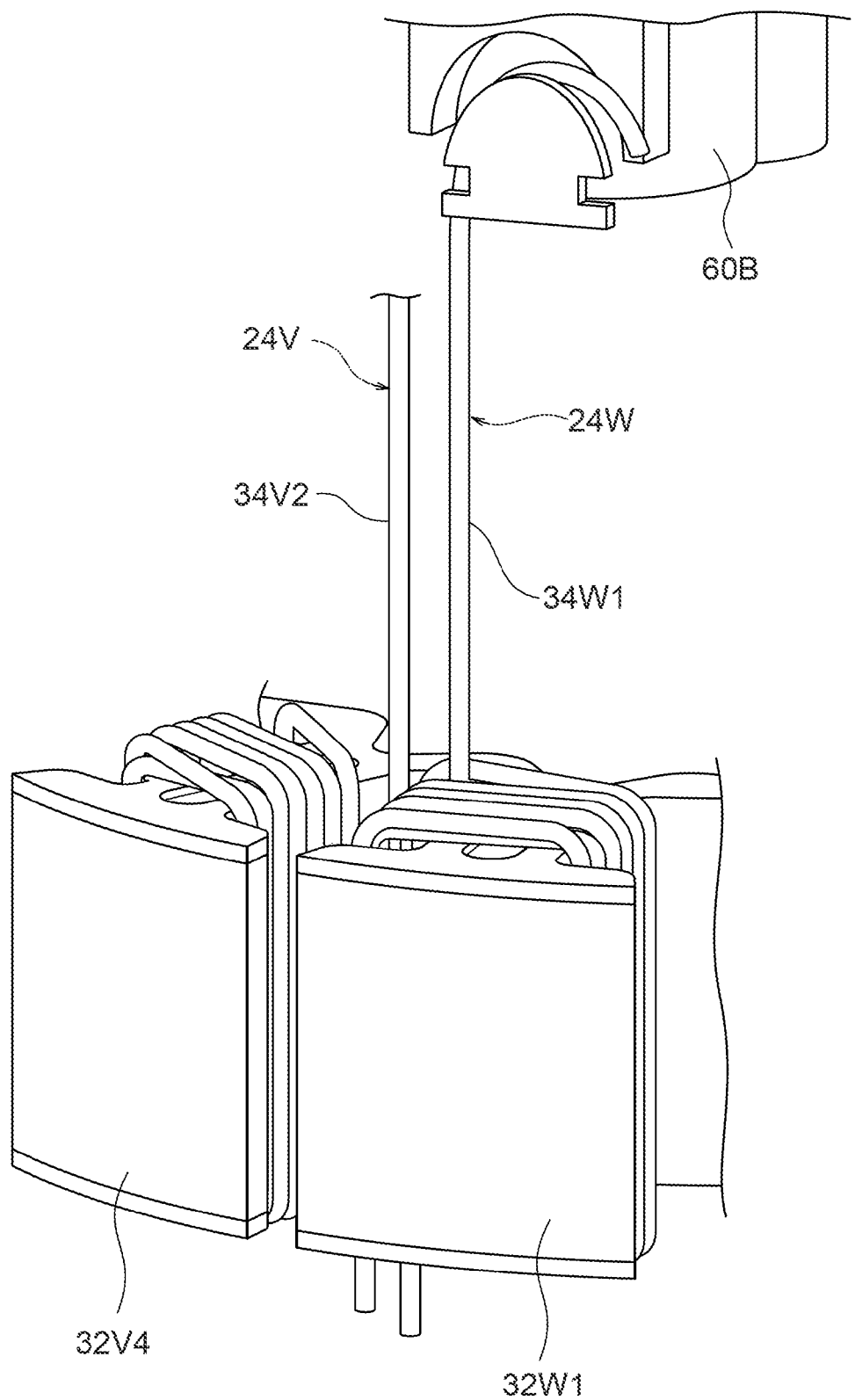
FIG. 15B is a perspective view illustrating a state in which a winding start end portion of a W-phase winding is retained by a retaining jig in a Comparative Example.

As a result, as viewed from the leading end side of the tooth 32V4 as illustrated in FIG. 15A, the winding finish terminal-end portion 34V2 of the winding 24V can be retained at the right side of a retaining jig 60A, and, as viewed from the leading end side of the tooth 32W1 as illustrated in FIG. 15B, the winding start terminal-end portion 34W1 of the winding 24W can be retained at the left side of a retaining jig 60B. This thereby enables interference between the winding finish terminal-end portion 34V2 of the winding 24V and the retaining jig 60B to be avoided.

Figure 15C:
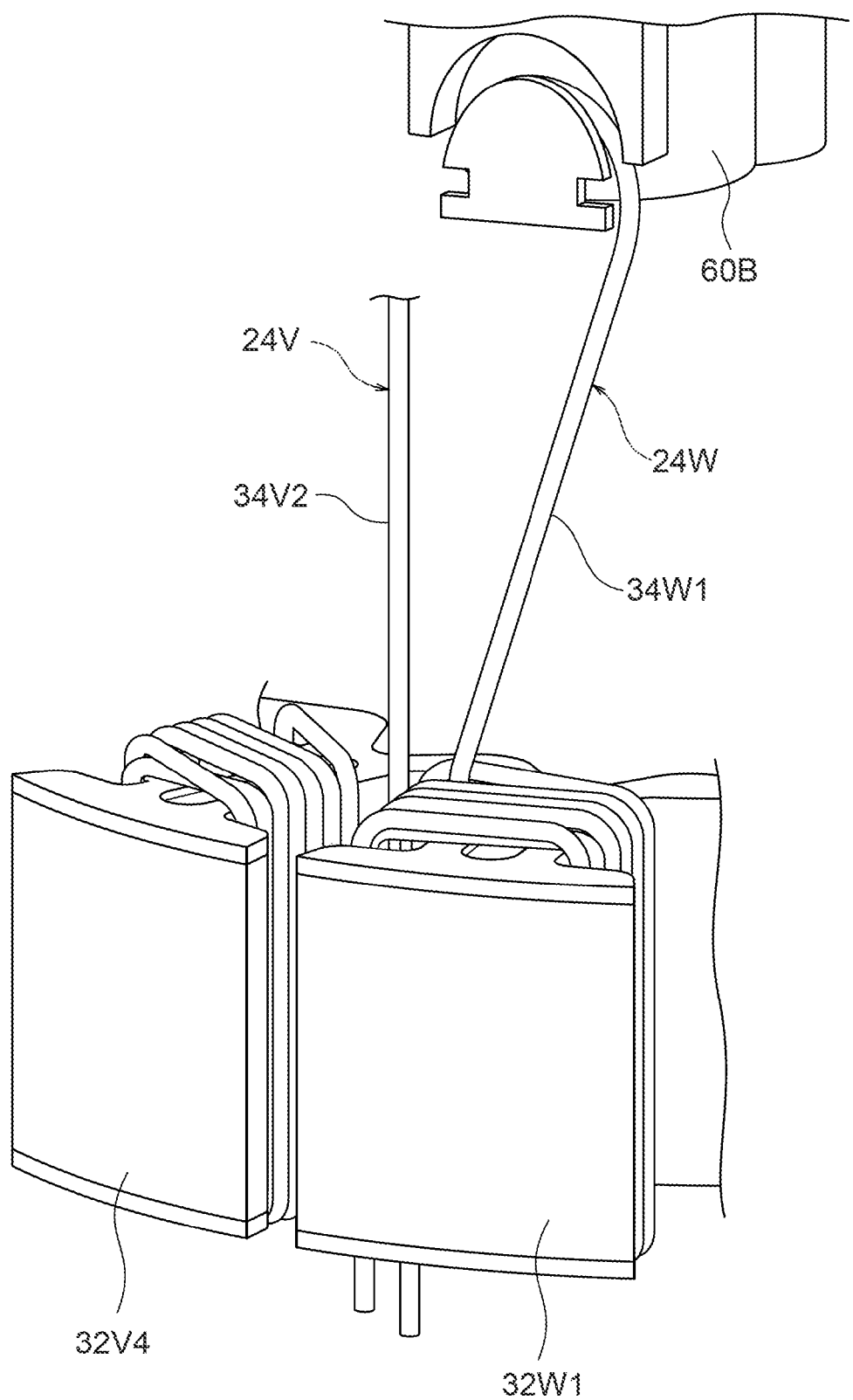
FIG. 15C is a perspective view illustrating a state in which a winding start end portion of a W-phase winding is retained by a retaining jig in a Comparative Example.

Note that, as viewed from the leading end side of the tooth 32W1 as illustrated in FIG. 15C, when the winding start terminal-end portion 34W1 of the winding 24W is retained at the right side of the retaining jig 60B, interference between the winding finish terminal-end portion 34V2 of the winding 24V and the retaining jig 60B needs to be avoided, and it is difficult to dispose the winding finish terminal-end portion 34V2 of the winding 24V alongside the winding start terminal-end portion 34W1 of the winding 24W. However, retaining the winding start terminal-end portion 34W1 of the winding 24W at the left side of the retaining jig 60B, as illustrated in FIG. 15B, enables the winding finish terminal-end portion 34V2 of the winding 24V and the winding start terminal-end portion 34W1 of the winding 24W to be disposed in alongside each other.

Moreover, the positions of the winding start terminal-end portion 34W1 and the winding finish terminal-end portion 34W2 of the winding 24W in the modified example illustrated in FIG. 14A and FIG. 14B, as described above, are switched, with respect to the positions of the winding start terminal-end portion 34W1 and the winding finish terminal-end portion 34W2 of the winding 24W illustrated in FIG. 1. In FIG. 14A, the winding start terminal-end portion 34W1 of the winding 24W is retained by the retaining portion 46C; however, the winding start terminal-end portion 34W1 of the winding 24W may be supported by a supporting portion similar to the supporting portions 52A, 52B described above (see FIG. 7 and FIG. 8), or to the retaining tab 48A that has a function as a supporting portion (see FIG. 9). Moreover, in FIG. 14A the winding finish terminal-end portion 34W2 of the winding 24W may be retained by a retaining portion similar to the retaining portion 46C.

In the present exemplary embodiment, the circuit section 14 is disposed offset to the one side (the arrow X1 side) in the direction orthogonal to the axial direction of the motor section 12 with respect to the motor section 12. However, as illustrated in FIG. 16, the circuit section 14 may also be disposed offset to the other side (the arrow X2 side) in the direction orthogonal to the axial direction of the motor section 12 with respect to the motor section 12.

Figure 16:
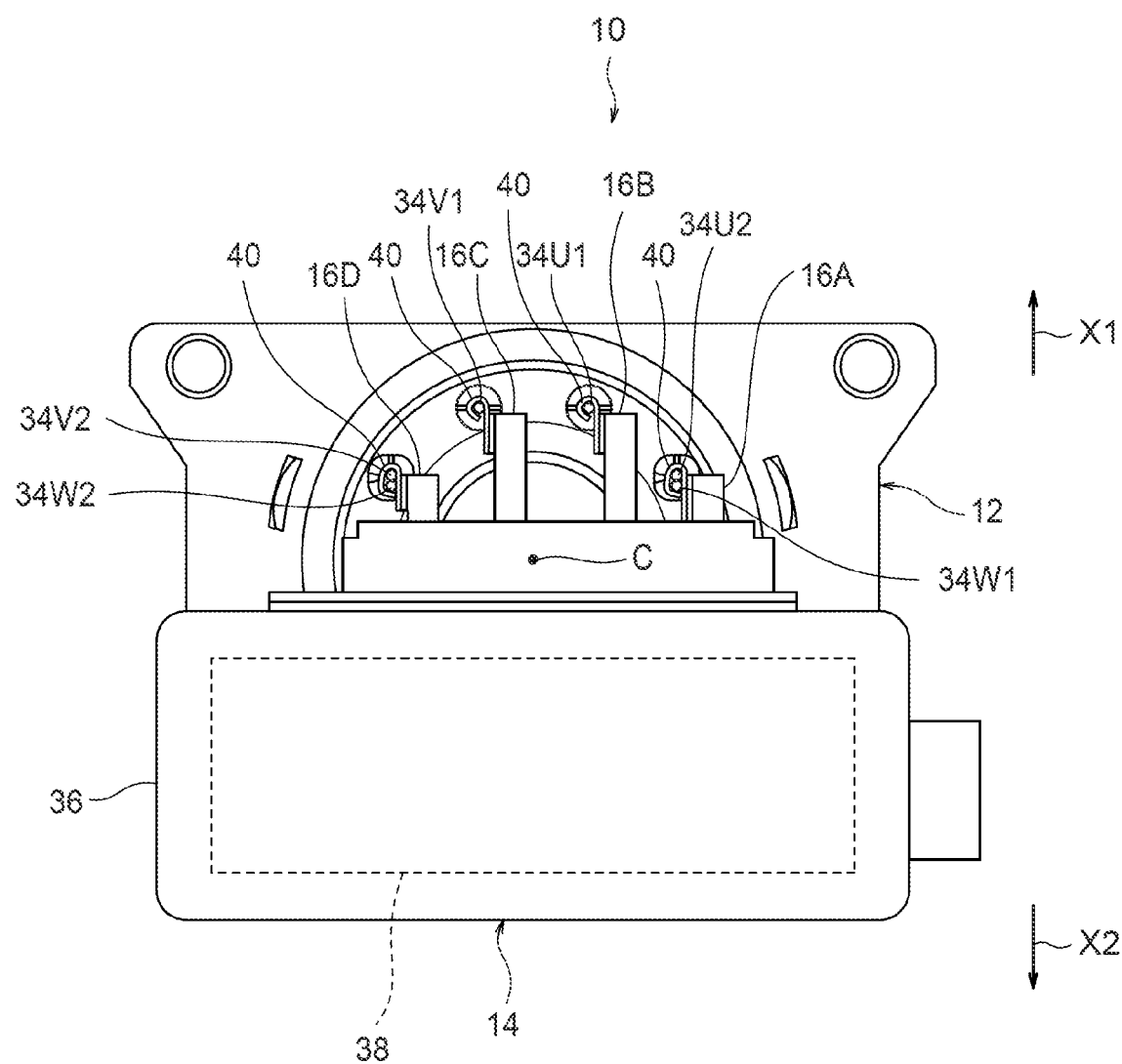
FIG. 16 is a plan view illustrating a modified example of a rotating electrical device.

In the modified example illustrated in FIG. 16, the configuration, placement, and orientation of the motor section 12 are unchanged with respect to the exemplary embodiment described above, and each of the terminal-end portions 34U1 to 34W2 are disposed further to the opposite side of the central axis C of the motor section 12 (the arrow X1 side, the one side in the direction orthogonal to the axial direction of the motor section 12) with respect to the circuit section 14 side. Also when configured in this manner, the structure of the terminals 16A to 16D for wiring-in the windings 24U, 24V, 24W can be simplified, enabling an increase in cost to be suppressed.

Note that, in the modified example illustrated in FIG. 16, the circuit section 14 is disposed in the motor section 12 axial direction while overlapping the motor section 12, and the surface area of overlap between the circuit section 14 and the motor section 12 is greater in the modified example illustrated in FIG. 16 than in the above exemplary embodiment (see FIG. 1). Configuration such as that employed in the modified example illustrated in FIG. 16 enables the projected surface area of the rotating electrical device 10 to be made smaller, as viewed in the motor section 12 axial direction. This enables a flow path surface area of a cooling airflow to be secured (the size of obstructions in the flow path to be made smaller) in cases in which the modified example illustrated in FIG. 16 is applied to a fan motor.

Moreover, out of the plural modified examples described above, modified examples capable of being combined may be combined and implemented as appropriate.

An exemplary embodiment of the present invention has been explained above, however, the present invention is not limited thereto, and it goes without saying that various other modifications may be implemented within a range not departing from the scope of the present invention.

What is claimed is:

1. A rotating electrical device, comprising:
a circuit section that is disposed offset from a motor section to one side or another side, in a direction orthogonal to a central axis of the motor section, as viewed in an axial direction of the motor section;
a stator configuring the motor section together with a rotor, the stator comprising a plurality of teeth formed in a radial shape and a plurality of windings that each includes terminal-end portions that extend in the axial direction of the motor section, the plurality of windings being respectively wound on any of the plurality of teeth such that each of the terminal-end portions is disposed further toward the circuit section than the central axis of the motor section, as viewed in the axial direction of the motor section; and
a plurality of terminals that wire-in the circuit section and the terminal-end portions of the plurality of windings, wherein:
the motor section comprises three phases of delta wired windings formed by the plurality of windings, and is configured as a 10-pole 12-slot, or a 14-pole 12-slot, outer-rotor brushless motor;
the plurality of teeth are formed in the radial shape at a periphery of a circular ring portion of the stator, the plurality of teeth are numbered from a $1^{st}$ tooth to a $12^{th}$ tooth in sequence along a circumferential direction of the stator, and the outer peripheral side of the stator is a leading end side of each of the teeth;
the first phase winding:
has a winding start terminal-end portion disposed between the $1^{st}$ tooth and the $2^{nd}$ tooth so as to extend toward one side in an axial direction of the stator, is wound on the 1st tooth in a counterclockwise direction as viewed from the leading end side of the 1st tooth, then pulled out at the other side in the axial direction of the stator as a crossover wire and routed to the 8th tooth while passing the circular ring portion, then wound on the 8th tooth in a counterclockwise direction as viewed from the leading end side of the 8th tooth, then wound on the 7th tooth in a clockwise direction as viewed from the leading end side of the 7th tooth, then pulled out as a crossover wire at the one side in the axial direction of the stator and routed to the 2nd tooth while passing the circular ring portion, then wound on the 2nd tooth in a clockwise direction as viewed from the leading end side of the 2nd tooth, and has a winding finish terminal-end portion disposed between the 2nd tooth and the 3rd tooth so as to extend toward the one side in the axial direction of the stator;

the second phase winding:

has a winding start terminal-end portion disposed between the 12th tooth and the 11th tooth so as to extend toward the one side in the axial direction of the stator, is wound on the 12th tooth in a clockwise direction as viewed from the leading end side of the 12th tooth, then pulled out at the other side in the axial direction of the stator as a crossover wire and routed to the 5th tooth while passing the circular ring portion, then wound on the 5th tooth in a clockwise direction as viewed from the leading end side of the 5th tooth, then wound on the 6th tooth in a counterclockwise direction as viewed from the leading end side of the 6th tooth, then pulled out at the one side in the axial direction of the stator as a crossover wire and routed to the 11th tooth while passing the circular ring portion, then wound on the 11th tooth in a counterclockwise direction as viewed from the leading end side of the 11th tooth, and has a winding finish terminal-end portion disposed between the 11th tooth and the 10th tooth so as to extend toward the one side in the axial direction of the stator;

the third phase winding:

has a winding start terminal-end portion disposed between the 2nd tooth and the 3rd tooth so as to extend toward the one side in the axial direction of the stator, is wound on the 3rd tooth in a clockwise direction as viewed from the leading end side of the 3rd tooth, then pulled out at the one side in the axial direction of the stator as a first crossover wire and routed to the 9th tooth while passing the circular ring portion, then wound on the 9th tooth in a counterclockwise direction as viewed from the leading end side of the 9th tooth, then pulled out at the one side in the axial direction of the stator as a second crossover wire and routed to the 4th tooth while passing the circular ring portion, then wound on the 4th tooth in a counterclockwise direction as viewed from the leading end side of the 4th tooth, then pulled out at the other side in the axial direction of the stator as a crossover wire and routed to the 10th tooth while passing the circular ring portion, then wound on the 10th tooth in a clockwise direction as viewed from the leading end side of the 10th tooth, and has a winding finish terminal-end portion disposed between the 10th tooth and the 11th tooth so as to extend toward the one side in the axial direction of the stator; and the stator is disposed such that the 1st, 2nd, 3rd, 10th, 11th and 12th teeth are positioned further toward the circuit section than the central axis of the motor section, as viewed in the axial direction of the motor section.

2. The rotating electrical device of claim 1, wherein:

the windings are wound on each of the teeth from a tooth base end side that is on the circular ring portion side of the stator; and when the windings are routed from one tooth to an adjacent tooth out of the 1st tooth to the 12th tooth, the final transition turn of the winding wound on the one tooth passes inside in a stator radial direction from the first turn of the winding wound on the one tooth.

3. The rotating electrical device of claim 2, wherein:

a protruding portion is formed at the stator so as to be interposed between the first turn and the final transition turn of the winding.

4. The rotating electrical device of claim 3, wherein:

a supporting portion is formed at the stator to support the winding start terminal-end portion of the winding.

5. The rotating electrical device of claim 3, wherein:

a retaining portion is formed at the stator to retain the winding finish terminal-end portion of the winding.

6. The rotating electrical device of claim 1, wherein:

a supporting portion is formed at the stator to support the winding start terminal-end portion of the winding.

7. The rotating electrical device of claim 1, wherein:

a retaining portion is formed at the stator to retain the winding finish terminal-end portion of the winding.

8. A rotating electrical device, comprising:

a circuit section that is disposed offset from a motor section to one side or another side, in a direction orthogonal to a central axis of the motor section, as viewed in an axial direction of the motor section;

a stator configuring the motor section together with a rotor, the stator comprising a plurality of teeth formed in a radial shape and a plurality of windings that each includes terminal-end portions that extend in the axial direction of the motor section, the plurality of windings being respectively wound on any of the plurality of teeth such that each of the terminal-end portions is disposed further toward the circuit section than the central axis of the motor section, as viewed in the axial direction of the motor section; and a plurality of terminals that wire-in the circuit section and the terminal-end portions of the plurality of windings, wherein:

the motor section includes three phases of delta wired windings formed by the plurality of windings, and is configured as a 10-pole 12-slot, or a 14-pole 12-slot, outer-rotor brushless motor;

the plurality of teeth are formed in the radial shape at a periphery of a circular ring portion of the stator, the plurality of teeth are numbered from a 1st tooth to a 12th tooth in sequence along a circumferential direction of the stator, and the outer peripheral side of the stator is a leading end side of each of the teeth;

the first phase winding:

has a winding start terminal-end portion disposed between the 1st tooth and the 2nd tooth so as to extend toward one side in an axial direction of the stator, and is wound on the 1st tooth in a counterclockwise direction as viewed from the leading end side of the 1st tooth, then pulled out at the other side in the axial direction of the stator as a crossover wire and routed to the $8^{th}$ tooth while passing the circular ring portion, then wound on the $8^{th}$ tooth in a counterclockwise direction as viewed from the leading end side of the $8^{th}$ tooth, then wound on the $7^{th}$ tooth in a clockwise direction as viewed from the leading end side of the $7^{th}$ tooth, then pulled out at the one side in the axial direction of the stator as a crossover wire and routed to the $2^{nd}$ tooth while passing the circular ring portion, then wound on the $2^{nd}$ tooth in a clockwise direction as viewed from the leading end side of the $2^{nd}$ tooth, and has a winding finish terminal-end portion disposed between the $2^{nd}$ tooth and the $3^{rd}$ tooth so as to extend toward the one side in the axial direction of the stator;

the second phase winding:

has a winding start terminal-end portion disposed between the $12^{th}$ tooth and the $11^{th}$ tooth so as to extend toward the one side in the axial direction of the stator, is wound on the $12^{th}$ tooth in a clockwise direction as viewed from the leading end side of the $12^{th}$ tooth, then pulled out at the other side in the axial direction of the stator as a crossover wire and routed to the $5^{th}$ tooth while passing the circular ring portion, then wound on the $5^{th}$ tooth in a clockwise direction as viewed from the leading end side of the $5^{th}$ tooth, then wound on the $6^{th}$ tooth in a counterclockwise direction as viewed from the leading end side of the $6^{th}$ tooth, then pulled out at the one side in the axial direction of the stator as a crossover wire and routed to the $11^{th}$ tooth while passing the circular ring portion, then wound on the $11^{th}$ tooth in a counterclockwise direction as viewed from the leading end side of the $11^{th}$ tooth, and has a winding finish terminal-end portion disposed between the $11^{th}$ tooth and the $10^{th}$ tooth so as to extend toward the one side in the axial direction of the stator;

the third phase winding:

has a winding start terminal-end portion disposed between the $2^{nd}$ tooth and the $3^{rd}$ tooth so as to extend toward the one side in the axial direction of the stator, is wound on the $3^{rd}$ tooth in a clockwise direction as viewed from the leading end side of the $3^{rd}$ tooth, then wound on the $4^{th}$ tooth in a counterclockwise direction as viewed from the leading end side of the $4^{th}$ tooth, then pulled out at the other side in the axial direction of the stator as a crossover wire and routed to the $9^{th}$ tooth while passing the circular ring portion, then wound on the $9^{th}$ tooth in a counterclockwise direction as viewed from the leading end side of the $9^{th}$ tooth, then wound on the $10^{th}$ tooth in a clockwise direction as viewed from the leading end side of the $10^{th}$ tooth, and has a winding finish terminal-end portion disposed between the $10^{th}$ tooth and the $11^{th}$ tooth so as to extend toward the one side in the axial direction of the stator; and the stator is disposed such that the $1^{st}$, $2^{nd}$, $3^{rd}$, $10^{th}$, $11^{th}$, and $12^{th}$ teeth are positioned further toward the circuit section than the central axis of the motor section, as viewed in the axial direction of the motor section.

9. A rotating electrical device, comprising:

a circuit section that is disposed offset from a motor section to one side or another side, in a direction orthogonal to a central axis of the motor section, as viewed in an axial direction of the motor section;

a stator configuring the motor section together with a rotor, the stator comprising a plurality of teeth formed in a radial shape and a plurality of windings that each includes terminal-end portions that extend in the axial direction of the motor section, the plurality of windings being respectively wound on any of the plurality of teeth such that each of the terminal-end portions is disposed further toward the circuit section than the central axis of the motor section, as viewed in the axial direction of the motor section; and a plurality of terminals that wire-in the circuit section and the terminal-end portions of the plurality of windings, wherein:

the motor section includes three phases of delta wired windings formed by the plurality of windings, and is configured as a 10-pole 12-slot, or a 14-pole 12-slot, outer-rotor brushless motor;

the plurality of teeth are formed in the radial shape at a periphery of a circular ring portion of the stator, the plurality of teeth are numbered from a $1^{st}$ tooth to a $12^{th}$ tooth in sequence along a circumferential direction of the stator, and an outer peripheral side of the stator is a leading end side of each of the teeth;

the first phase winding:

has a winding start terminal-end portion disposed between the $1^{st}$ tooth and the $2^{nd}$ tooth so as to extend toward one side in an axial direction of the stator, is wound on the $1^{st}$ tooth in a counterclockwise direction as viewed from the leading end side of the $1^{st}$ tooth, then pulled out at the other side in the axial direction of the stator as a crossover wire and routed to the $8^{th}$ tooth while passing the circular ring portion, then wound on the $8^{th}$ tooth in a counterclockwise direction as viewed from the leading end side of the $8^{th}$ tooth, then wound on the $7^{th}$ tooth in a clockwise direction as viewed from the leading end side of the $7^{th}$ tooth, then pulled out as a crossover wire at the one side in the axial direction of the stator and routed to the $2^{nd}$ tooth while passing the circular ring portion, then wound on the $2^{nd}$ tooth in a clockwise direction as viewed from the leading end side of the $2^{nd}$ tooth, and has a winding finish terminal-end portion disposed between the $2^{nd}$ tooth and the $3^{rd}$ tooth so as to extend toward the one side in the axial direction of the stator;

the second phase winding:

has a winding start terminal-end portion disposed between the $12^{th}$ tooth and the $11^{th}$ tooth so as to extend toward the one side in the axial direction of the stator, is wound on the $12^{th}$ tooth in a clockwise direction as viewed from the leading end side of the $12^{th}$ tooth, then pulled out at the other side in the axial direction of the stator as a crossover wire and routed to the $5^{th}$ tooth while passing the circular ring portion, then wound on the $5^{th}$ tooth in a clockwise direction as viewed from the leading end side of the $5^{th}$ tooth, then wound on the $6^{th}$ tooth in a counterclockwise direction as viewed from the leading end side of the $6^{th}$ tooth, then pulled out at the one side in the axial direction of the stator as a crossover wire and routed to the 11$^{th}$ tooth while passing the circular ring portion, then wound on the 11$^{th}$ tooth in a counterclockwise direction as viewed from the leading end side of the 11$^{th}$ tooth, and has a winding finish terminal-end portion disposed between the 11$^{th}$ tooth and the 10$^{th}$ tooth so as to extend toward the one side in the axial direction of the stator;

the third phase winding:

has a winding start terminal-end portion disposed between the 10$^{th}$ tooth and the 11$^{th}$ tooth so as to extend toward the one side in the axial direction of the stator, and is wound on the 10$^{th}$ tooth in a counterclockwise direction as viewed from the leading end side of the 10$^{th}$ tooth, then wound on the 9$^{th}$ tooth in a clockwise direction as viewed from the leading end side of the 9$^{th}$ tooth, then pulled out at the other side in the axial direction of the stator as a crossover wire and routed to the 4$^{th}$ tooth while passing the circular ring portion, then wound on the 4$^{th}$ tooth in a clockwise direction as viewed from the leading end side of the 4$^{th}$ tooth, then wound on the 3$^{rd}$ tooth in a counterclockwise direction as viewed from the leading end side of the 3$^{rd}$ tooth, and has a winding finish terminal-end portion disposed between the 2$^{nd}$ tooth and the 3$^{rd}$ tooth so as to extend toward the one side in the axial direction of the stator; and the stator is disposed such that the 1$^{st}$, 2$^{nd}$, 3$^{rd}$, 10$^{th}$, 11$^{th}$, and 12$^{th}$ teeth are positioned further toward the circuit section than the central axis of the motor section, as viewed in the axial direction of the motor section.

10. A rotating electrical device, comprising:

a circuit section that is disposed offset from a motor section to one side or another side, in a direction orthogonal to a central axis of the motor section, as viewed in an axial direction of the motor section;

a stator configuring the motor section together with a rotor, the stator comprising a plurality of teeth formed in a radial shape and a plurality of windings that each includes terminal-end portions that extend in the axial direction of the motor section, the plurality of windings being respectively wound on any of the plurality of teeth such that each of the terminal-end portions is disposed further toward an opposite side to the circuit section with respect to the central axis of the motor section, as viewed in the axial direction of the motor section; and a plurality of terminals that wire-in the circuit section and the terminal-end portions of the plurality of windings.

11. The rotating electrical device of claim 10, wherein:

the motor section comprises three phases of delta wired windings formed by the plurality of windings, and is configured as a 10-pole 12-slot, or a 14-pole 12-slot, outer-rotor brushless motor;

the plurality of teeth are formed in the radial shape at a periphery of a circular ring portion of the stator, the plurality of teeth are numbered from a 1$^{st}$ tooth to a 12$^{th}$ tooth in sequence along a circumferential direction of the stator, and the outer peripheral side of the stator is a leading end side of each of the teeth;

the first phase winding:

has a winding start terminal-end portion disposed between the 1$^{st}$ tooth and the 2$^{nd}$ tooth so as to extend toward one side in an axial direction of the stator, is wound on the 1$^{st}$ tooth in a counterclockwise direction as viewed from the leading end side of the 1$^{st}$ tooth, then pulled out at the other side in the axial direction of the stator as a crossover wire and routed to the 8$^{th}$ tooth while passing the circular ring portion, then wound on the 8$^{th}$ tooth in a counterclockwise direction as viewed from the leading end side of the 8$^{th}$ tooth, then wound on the 7$^{th}$ tooth in a clockwise direction as viewed from the leading end side of the 7$^{th}$ tooth, then pulled out as a crossover wire at the one side in the axial direction of the stator and routed to the 2$^{nd}$ tooth while passing the circular ring portion, then wound on the 2$^{nd}$ tooth in a clockwise direction as viewed from the leading end side of the 2$^{nd}$ tooth, and has a winding finish terminal-end portion disposed between the 2$^{nd}$ tooth and the 3$^{rd}$ tooth so as to extend toward the one side in the axial direction of the stator;

the second phase winding:

has a winding start terminal-end portion disposed between the 12$^{th}$ tooth and the 11$^{th}$ tooth so as to extend toward the one side in the axial direction of the stator, is wound on the 12$^{th}$ tooth in a clockwise direction as viewed from the leading end side of the 12$^{th}$ tooth, then pulled out at the other side in the axial direction of the stator as a crossover wire and routed to the 5$^{th}$ tooth while passing the circular ring portion, then wound on the 5$^{th}$ tooth in a clockwise direction as viewed from the leading end side of the 5$^{th}$ tooth, then wound on the 6$^{th}$ tooth in a counterclockwise direction as viewed from the leading end side of the 6$^{th}$ tooth, then pulled out at the one side in the axial direction of the stator as a crossover wire and routed to the 11$^{th}$ tooth while passing the circular ring portion, then wound on the 11$^{th}$ tooth in a counterclockwise direction as viewed from the leading end side of the 11$^{th}$ tooth, and has a winding finish terminal-end portion disposed between the 11$^{th}$ tooth and the 10$^{th}$ tooth so as to extend toward the one side in the axial direction of the stator;

the third phase winding:

has a winding start terminal-end portion disposed between the 2$^{nd}$ tooth and the 3$^{rd}$ tooth so as to extend toward the one side in the axial direction of the stator, is wound on the 3$^{rd}$ tooth in a clockwise direction as viewed from the leading end side of the 3$^{rd}$ tooth, then pulled out at the one side in the axial direction of the stator as a first crossover wire and routed to the 9$^{th}$ tooth while passing the circular ring portion, then wound on the 9$^{th}$ tooth in a counterclockwise direction as viewed from the leading end side of the 9$^{th}$ tooth, then pulled out at the one side in the axial direction of the stator as a second crossover wire and routed to the 4$^{th}$ tooth while passing the circular ring portion, then wound on the 4$^{th}$ tooth in a counterclockwise direction as viewed from the leading end side of the 4$^{th}$ tooth, then pulled out at the other side in the axial direction of the stator as a crossover wire and routed to the 10$^{th}$ tooth while passing the circular ring portion, then wound on the 10$^{th}$ tooth in a clockwise direction as viewed from the leading end side of the 10$^{th}$ tooth, and has a winding finish terminal-end portion disposed between the 10$^{th}$ tooth and the 11$^{th}$ tooth so as to extend toward the one side in the axial direction of the stator; and the stator is disposed such that the 1$^{st}$, 2$^{nd}$, 3$^{rd}$, 10$^{th}$, 11$^{th}$ and 12$^{th}$ teeth are positioned further toward the circuit section than the central axis of the motor section, as viewed in the axial direction of the motor section.

12. The rotating electrical device of claim 10, wherein:

the motor section includes three phases of delta wired windings formed by the plurality of windings, and is configured as a 10-pole 12-slot, or a 14-pole 12-slot, outer-rotor brushless motor;

the plurality of teeth are formed in the radial shape at a periphery of a circular ring portion of the stator, the plurality of teeth are numbered from a 1$^{st}$ tooth to a 12$^{th}$ tooth in sequence along a circumferential direction of the stator, and the outer peripheral side of the stator is a leading end side of each of the teeth;

the first phase winding:
has a winding start terminal-end portion disposed between the 1$^{st}$ tooth and the 2$^{nd}$ tooth so as to extend toward one side in an axial direction of the stator, and
is wound on the 1$^{st}$ tooth in a counterclockwise direction as viewed from the leading end side of the 1$^{st}$ tooth, then pulled out at the other side in the axial direction of the stator as a crossover wire and routed to the 8$^{th}$ tooth while passing the circular ring portion, then wound on the 8$^{th}$ tooth in a counterclockwise direction as viewed from the leading end side of the 8$^{th}$ tooth, then wound on the 7$^{th}$ tooth in a clockwise direction as viewed from the leading end side of the 7$^{th}$ tooth, then pulled out at the one side in the axial direction of the stator as a crossover wire and routed to the 2$^{nd}$ tooth while passing the circular ring portion, then wound on the 2$^{nd}$ tooth in a clockwise direction as viewed from the leading end side of the 2$^{nd}$ tooth, and
has a winding finish terminal-end portion disposed between the 2$^{nd}$ tooth and the 3$^{rd}$ tooth so as to extend toward the one side in the axial direction of the stator;

the second phase winding:
has a winding start terminal-end portion disposed between the 12$^{th}$ tooth and the 11$^{th}$ tooth so as to extend toward the one side in the axial direction of the stator,
is wound on the 12$^{th}$ tooth in a clockwise direction as viewed from the leading end side of the 12$^{th}$ tooth, then pulled out at the other side in the axial direction of the stator as a crossover wire and routed to the 5$^{th}$ tooth while passing the circular ring portion, then wound on the 5$^{th}$ tooth in a clockwise direction as viewed from the leading end side of the 5$^{th}$ tooth, then wound on the 6$^{th}$ tooth in a counterclockwise direction as viewed from the leading end side of the 6$^{th}$ tooth, then pulled out at the one side in the axial direction of the stator as a crossover wire and routed to the 11$^{th}$ tooth while passing the circular ring portion, then wound on the 11$^{th}$ tooth in a counterclockwise direction as viewed from the leading end side of the 11$^{th}$ tooth, and
has a winding finish terminal-end portion disposed between the 11$^{th}$ tooth and the 10$^{th}$ tooth so as to extend toward the one side in the axial direction of the stator;

the third phase winding:
has a winding start terminal-end portion disposed between the 2$^{nd}$ tooth and the 3$^{rd}$ tooth so as to extend toward the one side in the axial direction of the stator,
is wound on the 3$^{rd}$ tooth in a clockwise direction as viewed from the leading end side of the 3$^{rd}$ tooth, then wound on the 4$^{th}$ tooth in a counterclockwise direction as viewed from the leading end side of the 4$^{th}$ tooth, then pulled out at the other side in the axial direction of the stator as a crossover wire and routed to the 9$^{th}$ tooth while passing the circular ring portion, then wound on the 9$^{th}$ tooth in a counterclockwise direction as viewed from the leading end side of the 9$^{th}$ tooth, then wound on the 10$^{th}$ tooth in a clockwise direction as viewed from the leading end side of the 10$^{th}$ tooth, and
has a winding finish terminal-end portion disposed between the 10$^{th}$ tooth and the 11$^{th}$ tooth so as to extend toward the one side in the axial direction of the stator; and the stator is disposed such that the 1$^{st}$, 2$^{nd}$, 3$^{rd}$, 10$^{th}$, 11$^{th}$, and 12$^{th}$ teeth are positioned further toward the circuit section than the central axis of the motor section, as viewed in the axial direction of the motor section.

13. The rotating electrical device of claim 10, wherein:

the motor section includes three phases of delta wired windings formed by the plurality of windings, and is configured as a 10-pole 12-slot, or a 14-pole 12-slot, outer-rotor brushless motor;

the plurality of teeth are formed in the radial shape at a periphery of a circular ring portion of the stator, the plurality of teeth are numbered from a 1$^{st}$ tooth to a 12$^{th}$ tooth in sequence along a circumferential direction of the stator, and an outer peripheral side of the stator is a leading end side of each of the teeth;

the first phase winding:
has a winding start terminal-end portion disposed between the 1$^{st}$ tooth and the 2$^{nd}$ tooth so as to extend toward one side in an axial direction of the stator,
is wound on the 1$^{st}$ tooth in a counterclockwise direction as viewed from the leading end side of the 1$^{st}$ tooth, then pulled out at the other side in the axial direction of the stator as a crossover wire and routed to the 8$^{th}$ tooth while passing the circular ring portion, then wound on the 8$^{th}$ tooth in a counterclockwise direction as viewed from the leading end side of the 8$^{th}$ tooth, then wound on the 7$^{th}$ tooth in a clockwise direction as viewed from the leading end side of the 7$^{th}$ tooth, then pulled out as a crossover wire at the one side in the axial direction of the stator and routed to the 2$^{nd}$ tooth while passing the circular ring portion, then wound on the 2$^{nd}$ tooth in a clockwise direction as viewed from the leading end side of the 2$^{nd}$ tooth, and
has a winding finish terminal-end portion disposed between the 2$^{nd}$ tooth and the 3$^{rd}$ tooth so as to extend toward the one side in the axial direction of the stator;

the second phase winding:
has a winding start terminal-end portion disposed between the 12$^{th}$ tooth and the 11$^{th}$ tooth so as to extend toward the one side in the axial direction of the stator,
is wound on the 12$^{th}$ tooth in a clockwise direction as viewed from the leading end side of the 12$^{th}$ tooth, then pulled out at the other side in the axial direction of the stator as a crossover wire and routed to the 5$^{th}$ tooth while passing the circular ring portion, then wound on the 5$^{th}$ tooth in a clockwise direction as viewed from the leading end side of the 5$^{th}$ tooth, then wound on the 6$^{th}$ tooth in a counterclockwise direction as viewed from the leading end side of the 6$^{th}$ tooth, then pulled out at the one side in the axial direction of the stator as a crossover wire and routed to the 11$^{th}$ tooth while passing the circular ring portion, then wound on the 11$^{th}$ tooth in a counterclockwise direction as viewed from the leading end side of the 11$^{th}$ tooth, and has a winding finish terminal-end portion disposed between the 11$^{th}$ tooth and the 10$^{th}$ tooth so as to extend toward the one side in the axial direction of the stator;

the third phase winding:

has a winding start terminal-end portion disposed between the 10$^{th}$ tooth and the 11$^{th}$ tooth so as to extend toward the one side in the axial direction of the stator, and is wound on the 10$^{th}$ tooth in a counterclockwise direction as viewed from the leading end side of the 10$^{th}$ tooth, then wound on the 9$^{th}$ tooth in a clockwise direction as viewed from the leading end side of the 9$^{th}$ tooth, then pulled out at the other side in the axial direction of the stator as a crossover wire and routed to the 4$^{th}$ tooth while passing the circular ring portion, then wound on the 4$^{th}$ tooth in a clockwise direction as viewed from the leading end side of the 4$^{th}$ tooth, then wound on the 3$^{rd}$ tooth in a counterclockwise direction as viewed from the leading end side of the 3$^{rd}$ tooth, and has a winding finish terminal-end portion disposed between the 2$^{nd}$ tooth and the 3$^{rd}$ tooth so as to extend toward the one side in the axial direction of the stator; and the stator is disposed such that the 1$^{st}$, 2$^{nd}$, 3$^{rd}$, 10$^{th}$, 11$^{th}$, and 12$^{th}$ teeth are positioned further toward the circuit section than the central axis of the motor section, as viewed in the axial direction of the motor section.

* * * * *